United States Patent
Martini

(10) Patent No.: US 9,679,381 B2
(45) Date of Patent: Jun. 13, 2017

(54) LOCALISATION AND MAPPING

(71) Applicant: Sony Computer Entertainment Europe Limited, London (GB)

(72) Inventor: Antonio Martini, London (GB)

(73) Assignee: Sony Computer Entertainment Europe Limited (GB)

( * ) Notice: Subject to any disclaimer, the term of this patent is extended or adjusted under 35 U.S.C. 154(b) by 139 days.

(21) Appl. No.: 14/417,938

(22) PCT Filed: Jul. 25, 2013

(86) PCT No.: PCT/GB2013/051994
§ 371 (c)(1),
(2) Date: Jan. 28, 2015

(87) PCT Pub. No.: WO2014/020317
PCT Pub. Date: Feb. 6, 2014

(65) Prior Publication Data
US 2015/0209673 A1 Jul. 30, 2015

(30) Foreign Application Priority Data

Jul. 30, 2012 (GB) .................................. 1213542.2

(51) Int. Cl.
*A63F 13/00* (2014.01)
*G06T 7/00* (2017.01)
(Continued)

(52) U.S. Cl.
CPC ............ *G06T 7/0044* (2013.01); *A63F 13/25* (2014.09); *A63F 13/50* (2014.09);
(Continued)

(58) Field of Classification Search
CPC .......... A63F 13/40; A63F 13/50; A63F 13/52; A63F 13/53
(Continued)

(56) References Cited

U.S. PATENT DOCUMENTS

| 5,220,619 A | 6/1993 | Keokoek |
| 5,889,550 A | 3/1999 | Reynolds |

(Continued)

FOREIGN PATENT DOCUMENTS

| WO | 2012127605 | 9/2012 |
| WO | 2013027628 A1 | 2/2013 |

OTHER PUBLICATIONS

Davison A J: "Active Search for Real-Time Vision", Computer Vision, 2005. ICCV 2005. Tenth IEEE International Conference on Beijing, China Oct. 17-20, 2005, Piscataway, NJ, USA, IEEE, Los Alamitos, CA, USA, vol. 1, Oct. 17, 2005 (Oct. 17, 2005), pp. 66-73, XP01 0854772, DOI: 10.11 09/ICCV.2005.29, ISBN: 978-0-7695-2334-7.

(Continued)

*Primary Examiner* — James S McClellan
(74) *Attorney, Agent, or Firm* — Lerner, David, Littenberg, Krumholz & Mentlik, LLP

(57) ABSTRACT

A method generates a three-dimensional map of a region from successive images of that region captured from different positions. The method includes detecting feature points within the captured images; designating a subset of the captured images as a set of keyframes each having respective sets of measurement data representing image positions of landmark points detected as feature points in that image, where each keyframe is connected to at least one other keyframe in the set; and detecting whether candidate measurement data associated with a keyframe may be removed from the set of measurement data for that keyframe by detecting whether each keyframe, in the set of keyframes without the candidate measurement data, is still directly or indirectly connected to all of the other keyframes in the set of keyframes by a sequence of one or more connections. And (Continued)

in this case, the method includes removing that candidate measurement data.

13 Claims, 21 Drawing Sheets

(51) Int. Cl.

| | | |
|---|---|---|
| *G06K 9/00* | (2006.01) | |
| *G06K 9/46* | (2006.01) | |
| *G06T 15/10* | (2011.01) | |
| *H04N 13/02* | (2006.01) | |
| *G06K 9/52* | (2006.01) | |
| *G06T 19/00* | (2011.01) | |
| *H04N 7/18* | (2006.01) | |
| *G06T 17/05* | (2011.01) | |
| *A63F 13/5378* | (2014.01) | |
| *A63F 13/25* | (2014.01) | |
| *A63F 13/50* | (2014.01) | |
| *G06T 7/73* | (2017.01) | |
| *G06T 7/55* | (2017.01) | |
| *G06T 7/13* | (2017.01) | |
| *G06T 7/246* | (2017.01) | |

(52) U.S. Cl.
CPC ...... *A63F 13/5378* (2014.09); *G06K 9/00476* (2013.01); *G06K 9/46* (2013.01); *G06K 9/468* (2013.01); *G06K 9/52* (2013.01); *G06T 7/0008* (2013.01); *G06T 7/13* (2017.01); *G06T 7/246* (2017.01); *G06T 7/55* (2017.01); *G06T 7/73* (2017.01); *G06T 7/74* (2017.01); *G06T 15/10* (2013.01); *G06T 17/05* (2013.01); *G06T 19/006* (2013.01); *H04N 7/18* (2013.01); *H04N 13/021* (2013.01); *H04N 13/0207* (2013.01); *G06T 2200/08* (2013.01); *G06T 2207/10012* (2013.01); *G06T 2207/10016* (2013.01); *G06T 2207/20021* (2013.01); *G06T 2207/30244* (2013.01); *G06T 2215/16* (2013.01); *G06T 2219/2004* (2013.01)

(58) Field of Classification Search
USPC ..................................................... 463/31, 42
See application file for complete search history.

(56) References Cited

U.S. PATENT DOCUMENTS

| | | | |
|---|---|---|---|
| 8,786,680 | B2 | 7/2014 | Shiratori et al. |
| 2006/0078214 | A1 | 4/2006 | Gallagher |
| 2006/0140497 | A1 | 6/2006 | Kondo et al. |
| 2007/0052807 | A1* | 3/2007 | Zhou ................. H04N 7/181 348/159 |
| 2008/0260205 | A1 | 10/2008 | Von Berg et al. |
| 2009/0154791 | A1 | 6/2009 | Yoon et al. |
| 2011/0090252 | A1 | 4/2011 | Yoon et al. |
| 2011/0165893 | A1 | 7/2011 | Hyung et al. |
| 2011/0310087 | A1 | 12/2011 | Wright, Jr. et al. |
| 2012/0155775 | A1 | 6/2012 | Ahn et al. |
| 2012/0230550 | A1 | 9/2012 | Kraut |
| 2013/0267309 | A1* | 10/2013 | Robbins ................. A63F 9/24 463/31 |
| 2014/0240501 | A1 | 8/2014 | Newman et al. |
| 2014/0241576 | A1 | 8/2014 | Yu et al. |

OTHER PUBLICATIONS

International Preliminary Report on Patentability for Application No. PCT/GB2013/051993 dated Feb. 18, 2015.
International Preliminary Report on Patentability for Application No. PCT/GB2013/051995 dated Feb. 18, 2015.
International Preliminary Report on Patentability for Application No. PCT/GB2013/051997 dated Feb. 3, 2015.
International Search Report and Written Opinion for Application No. PCT/GB2013/051997 dated Oct. 18, 2013.
International Search Report for Application No. PCT/GB2013/051993 dated Jan. 22, 2014.
Viktor Danhall: 11 Feature Extraction From Images of Buildings Using Edge Orientation and Lengths,Bachelor Thesis, Jun. 1, 2012 (Jun. 1, 2012) pp. 1-33, XP55082775 University of Gavle, Sweden Retrieved from the Internet: URL: http://hig.diva-portal.orgjsmashjget/diva2:542410/FULLTEXT01 [retrieved on Oct. 7, 2013] p. 6 p. 11 abstract.
Yongkwon Kim et al: "Building Recognition for Augmented Reality Based Navigation System", Computer and Information Technology, 2006. CIT '06., Sep. 1, 2006 (Sep. 1, 2006), pp. 131-136, XP031021726.
Zhang Z: "Determining the Epipolar Geometry and Its Uncertainty: a Review", International Journal of Computer Vision, Kluwer Academic Publishers, Norwell, US, vol. 27, No. 2, Mar. 1, 1998 (Mar. 1, 1998), pp. 161-195, XP000755415.
International Preliminary Report on Patentability for Application No. PCT/GB2013/051996 dated Feb. 3, 2015.
Webpage—"Axis-angle representation," Retrieved from the Internet on Jul. 25, 2013, <<http://en.wikipedia.org/wiki/Axis-angle_representation.
Webpage—"Epipolar geometry.svg," Retrieved from the Internet on Jul. 24, 2013, <<http://en.wikipedia.org/wiki/File:Epipolar_geometry.svg.
Webpage—"Camera Calibration Toolbox for Matlab," Retrieved from the Internet on Jul. 24, 2013, <<http://www.vision.caltech.edu/bouguetj/calib_doc/htmls/parameters.html.
Georg Klein and David Murray, "Improving the agility of keyframe-based SLAM," Active Vision Laboratory, University of Oxford, UK, <http//www.robots.ox.ac.uk, 2008.
L. Kneip, M . Chli, R . Siegwart, "Robust Real-Time Visual Odometry with a Single Camera and an IMU", Autonomous Systems Lab, ETH Zurich, Switzerland, Copyright 2011.
Webpage—"5-point relative pose problem," Minimal problems in Computer Vision, Retrieved from the Internet on Jul. 24, 2013, <http://cmp.felk.cvut.cz/minimal/5_pt_relative.php.
International Preliminary Report on Patentability for Application No. PCT/GB2013/051994 dated Feb. 3, 2015.
Andrew J Davison et al: "MonoSLAM: Real-Time Single Camera SLAM", Transactions on Pattern Analys1s and Machine Intelligence, IEEE, Piscataway, USA, vol. 29, No. 6, Jun. 1, 2007 (Jun. 1, 2007), pp. 1052-1067, XP0111179664.
British Search Report for Application No. GB1213542.2 dated Jan. 29, 2014.
Georg Klein and David Murray, "Improving the agility of keyframe-based SLAM"?Proceedings of the European Conf on Computer Vision, Marseille, Oct. 2008, <http//www.robots.ox.ac.ukr/lav/Papers/Klein_murray_eccv2008/klein_murray_eccv2008.pdf>.
Georg Klein and David Murray, "Parallel Tracking and Mapping on a Camera Phone", In ProC. International Symposium on Mixed and Augmented Reality (ISMAR'09,Orlando), 2009, <www.robots.ox.ac.uk/gk/publications/KleinMurray2009ISMAR.pdf>.
International Search Report for Application No. PCT/GB2013/051994 dated Oct. 18, 2013.
International Search Report for Application No. PCT/GB2013/051996 dated Oct. 18, 2013.
Jonathan Kli Ppenstein et al: "Feature Initialization for Bearing-Only Visual SLAM Using Triangulation and the Unscented Transform", Mechatronics and Automation? 2007, ICMA 2007, International Conference on, IEEE, PI, Aug. 1, 2007 (Aug. 1, 2007), pp. 1599-1604, XP031134984.
Klein G et al: "Parallel Tracking and Mapping for Small AR Workspaces", Mixed and Augmented Reality, 2007, ISMAR 2007, 6th IEEE and ACM International Symposium on, IEEE, Piscataway, NJ, USA, Nov. 13, 2007 (Nov. 13, 2007), pp. 225-234, XP031269901.
L. Kneip, M . Chli, R . Siegwart, "Robust Real-Time Visual Odometry with a Single Camera and an IMU", British Machine

(56) References Cited

OTHER PUBLICATIONS

Vision Conference (BMVC), Dundee, Aug. 2011, <http://publications.als.ethz.ch/files/kneip11robust.pdf>.
Robust estimation: RANSAC—Universityof Szeged, Institute of Informatics: Computer Vision Lab Lecture Notes, Retrieved from the Internet on Jan. 26, 2015, <http://www.inf.u-szeged.hu/~kato/teaching/computervision/Lab05-RANSAC.pdf>.
Webpage—"5-point relative pose problem", Retrieved from the Internet on Jan. 26, 2015, <http://cmp.felk.cvut.cz/minimal/5_pt_relative.php>.
Webpage—"Axis-angle estimation", Retrieved from the Internet on Jan. 26, 2015, <<http://en.wikipedia.org/wiki/Axis%E2%80%93angle_represenation>.
Webpage—"Camera Calibration Toolbox for Matlab", Printed Jan. 26, 2015, Retrieved from the Internet on Jan. 26, 2015, <<http://www.vision.caltech.edu/boutiquetj/calib_doc/htmls/parameters.html>.
Webpage—"Epipolar geometry", Retrieved from the Internet on Jan. 26, 2015, <<http://en.wikipedia.org/wiki/File:Epipolar_geometry.svg>.
Zhan Wang et al: "Map-aided 6-DOF relative pose estimation for monocular SLAM using sparse information filters", Control Automation Robotics&Vision (ICARCV), 2010 11th International Conference on, IEEE, Dec. 7, 2010 (Dec. 7, 2010), pp. 1006-1011, XP031900108.
George Klein, Parallel Tracking and Mapping for Small AR Workspaces, Aug. 23, 2007.

\* cited by examiner

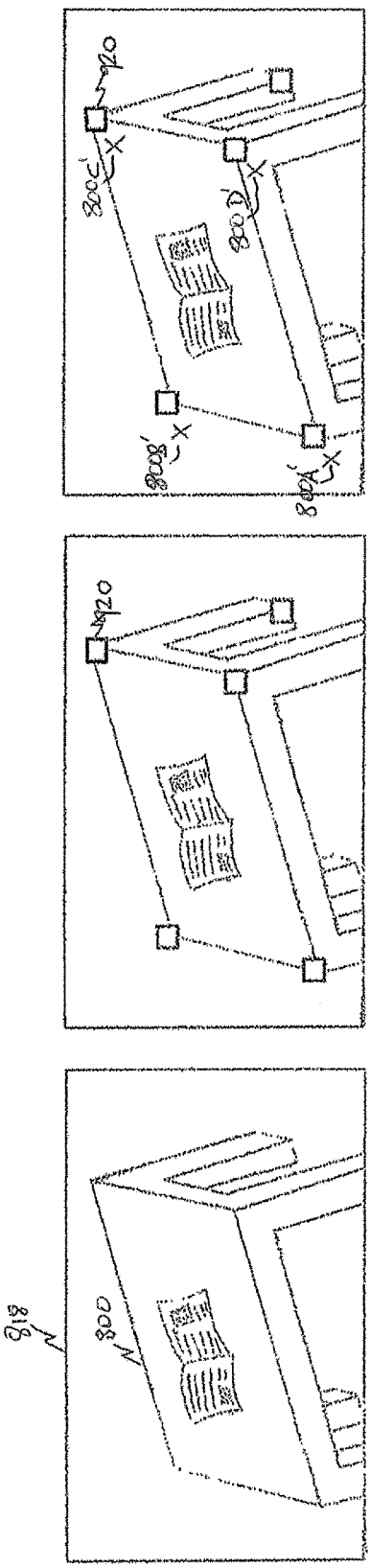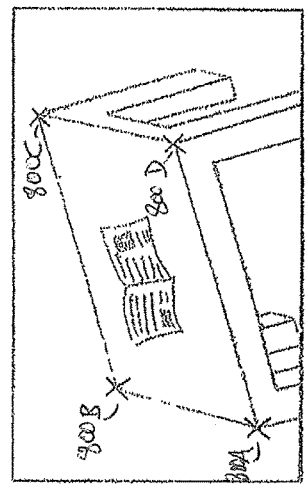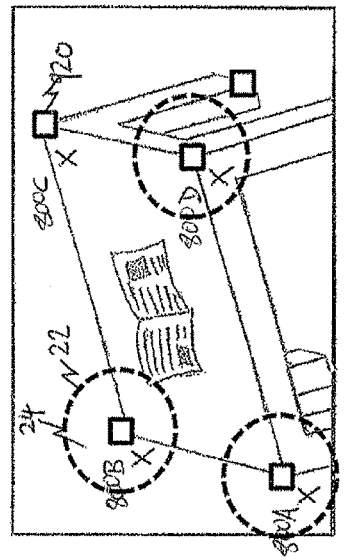

LOCALISATION AND MAPPING

CROSS REFERENCE TO RELATED APPLICATIONS

The present application is a national phase entry under 35 U.S.C. §371 of International Application No. PCT/GB2013/051994 filed Jul. 25, 2013, published in English, which claims the benefit of and priority to GB Patent Application No. 1213542.2, filed Jul. 30, 2012, the entire disclosures of which are hereby incorporated by reference herein.

This invention relates to localisation and mapping.

In some computer vision applications, there is a requirement to be able to process the 3-D position of image features captured by a 2-D camera. One example situation is found in robotics, in that a robot using computer vision may need to be able to map its environment and also know its own location with respect to that environment. Another example situation occurs in videogames, in that, for example, a hand-held gaming device having a camera built into the device can be used to capture images of the real surroundings, onto which so-called augmented reality (AR) image features can be rendered. For example, a gaming device may capture an image of a real building, but this is displayed to the user with an animal, superhero or other image rendered so as to be climbing up the side of the building. In another example, a computer-generated creature may be rendered so as to appear (in the rendered image) on a real table top.

In order to achieve this sort of AR rendering, the gaming device needs to be able to derive the orientation of the side of the building or the table top and an indication of its scale which may be derived as an indication of its relative distance from the camera compared to other captured image features.

It is possible to use so-called AR markers to assist in this process. These are predetermined patterns (for example, printed on cards which the user may position in space) which the gaming device can recognise for their size in the image (an indication of scale) and orientation. However, in other arrangements it is undesirable or impractical to use AR markers. This is particularly the case where the real objects which are being augmented by the AR graphics are large or not directly accessible by the user. Also, it can be inconvenient for the user to have to carry and position the AR markers before playing a game. So, in such cases the gaming device generally has no advance indication of either its own position in space or of the position in space of any of the objects which its camera is capturing.

Techniques have therefore been proposed, generically called "simultaneous localisation and mapping" (SLAM) in which the problems of building a map of the camera's environment and determining the position in space of the camera itself are bound together in a single iterative process. Accordingly, SLAM attempts to build a model or map of an unknown scene and estimate a camera position within that model.

It is a constant aim to provide improved localisation, mapping and/or augmented reality arrangements.

Respective aspects and features of the invention are defined in the appended claims.

Embodiments of the invention will now be described, with reference to the accompanying drawings in which:

FIGS. 1A and 1B schematically illustrate an embodiment of a portable entertainment device;

FIGS. 2 and 3 schematically illustrate functional features of the device of FIG. 1;

FIGS. 4 and 5 schematically illustrate cooperative processing arrangements;

FIG. 6 schematically illustrates a set of landmarks and two camera poses;

FIGS. 7a and 7b schematically illustrate images captured from the two camera poses of FIG. 6;

Figure 10:
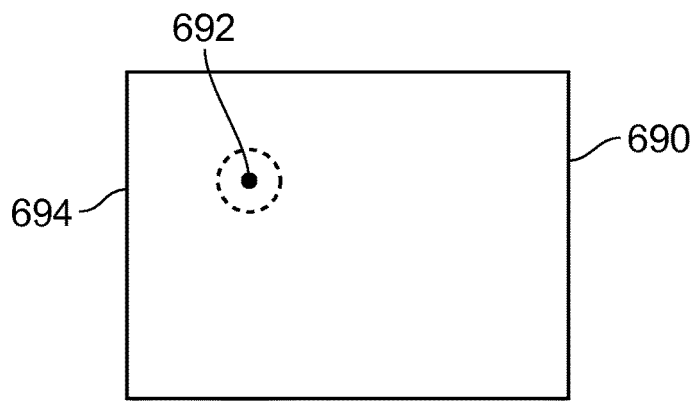
Figure 11:
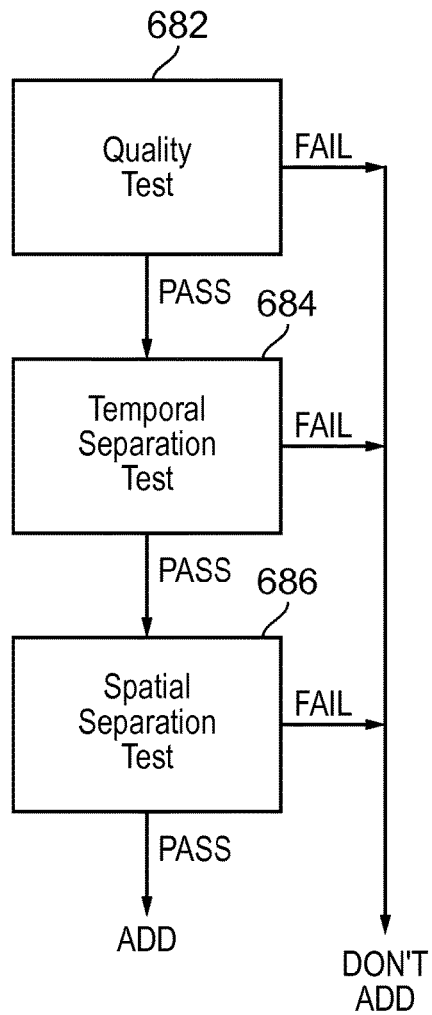
Figure 12:
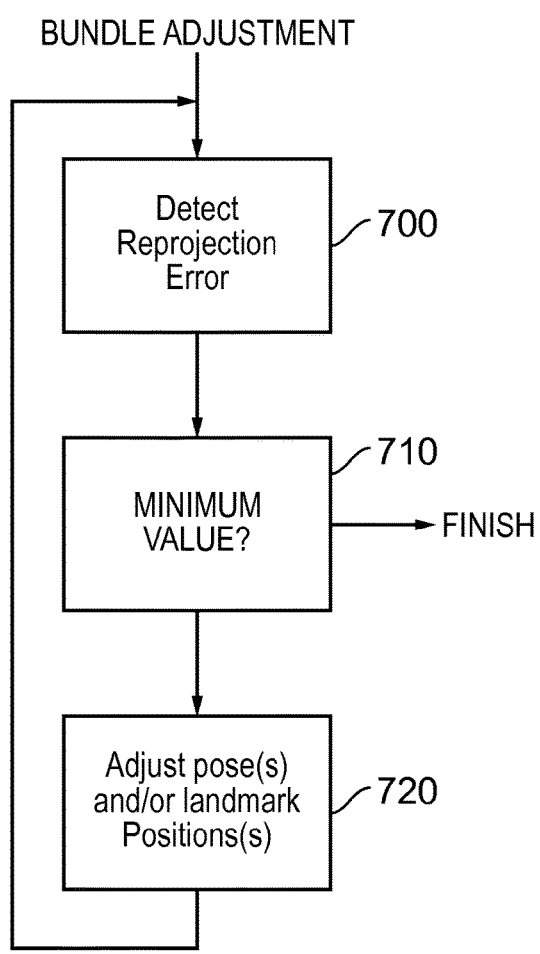
Figure 13:
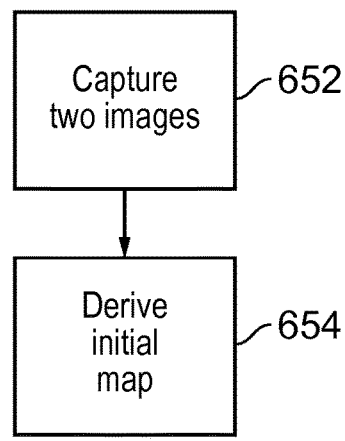
Figure 14:
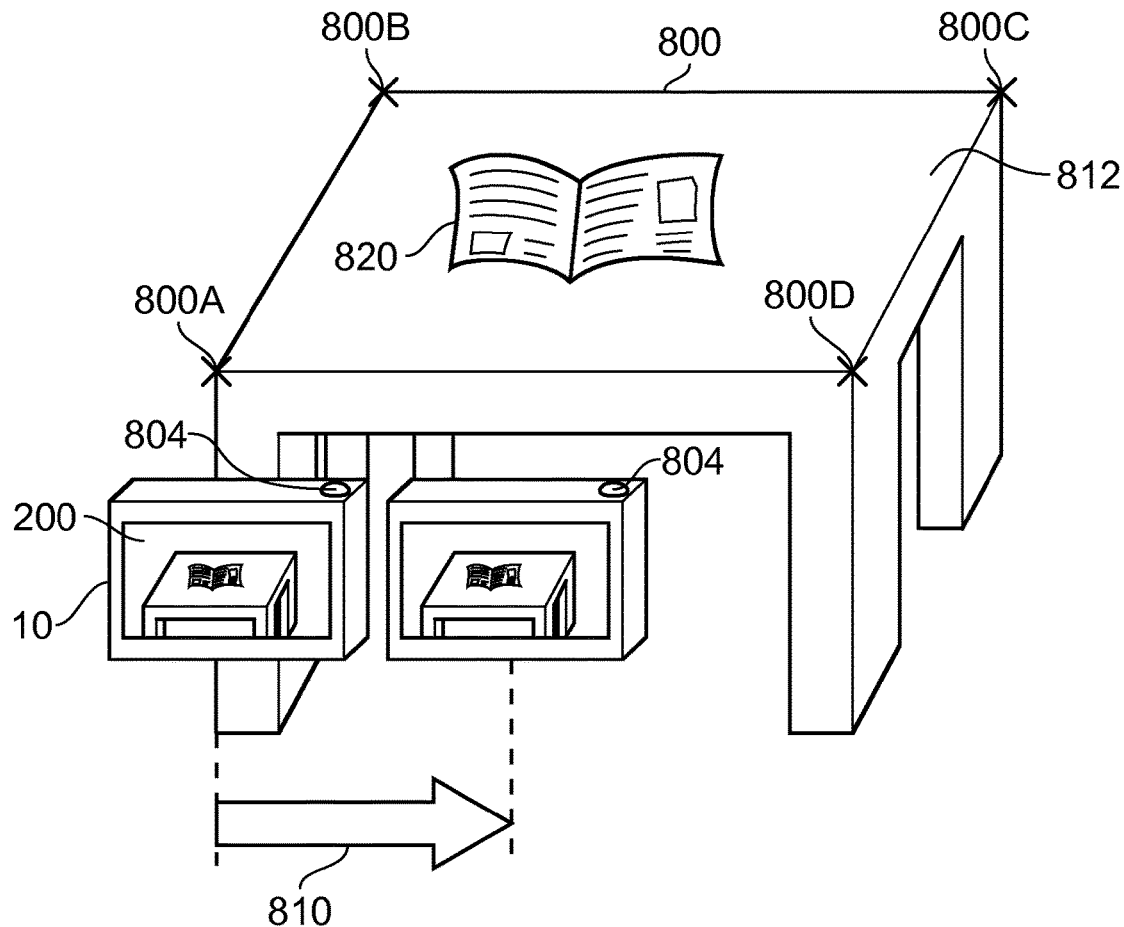
Figure 17C:
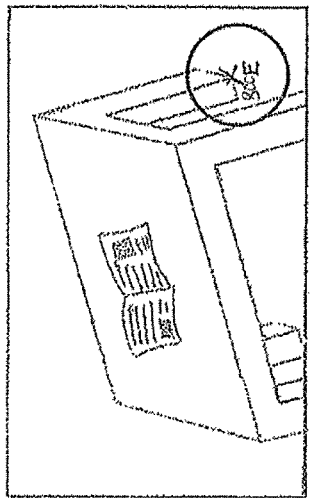
Figure 17B:
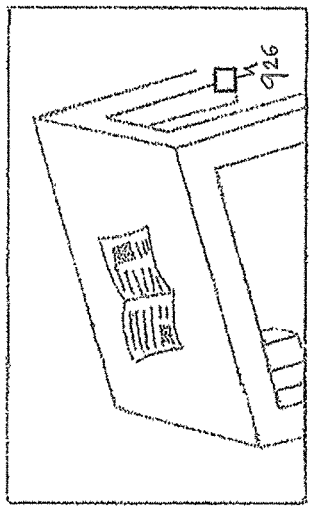
Figure 17A:
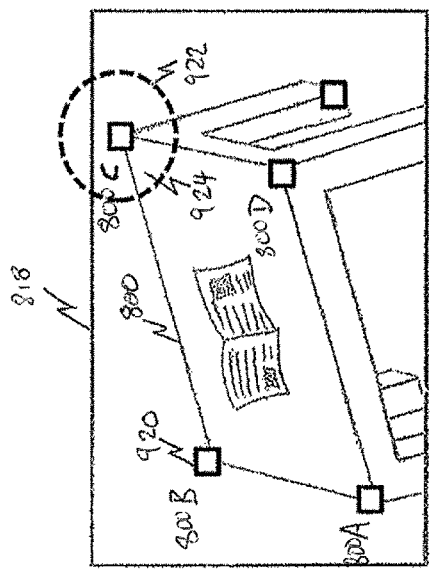
Figure 18:
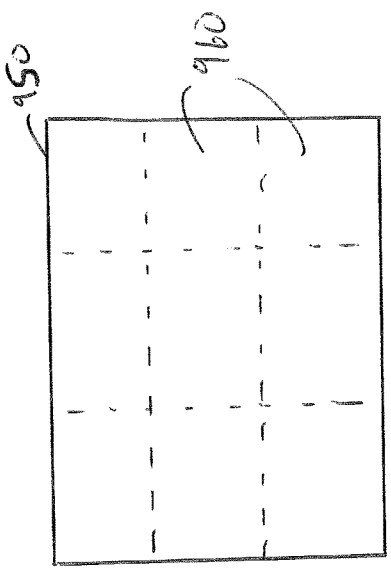
Figure 19:
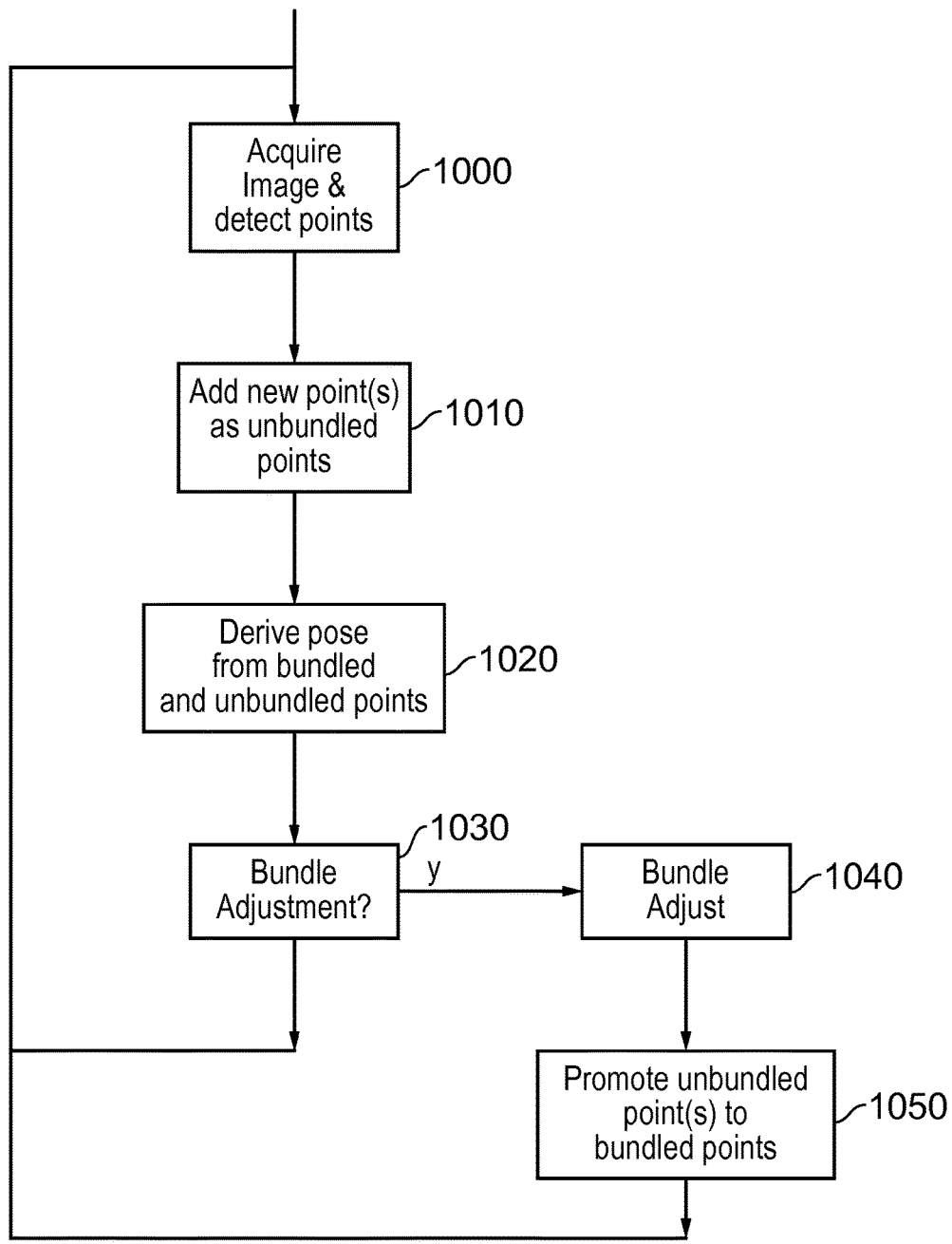
Figure 20:
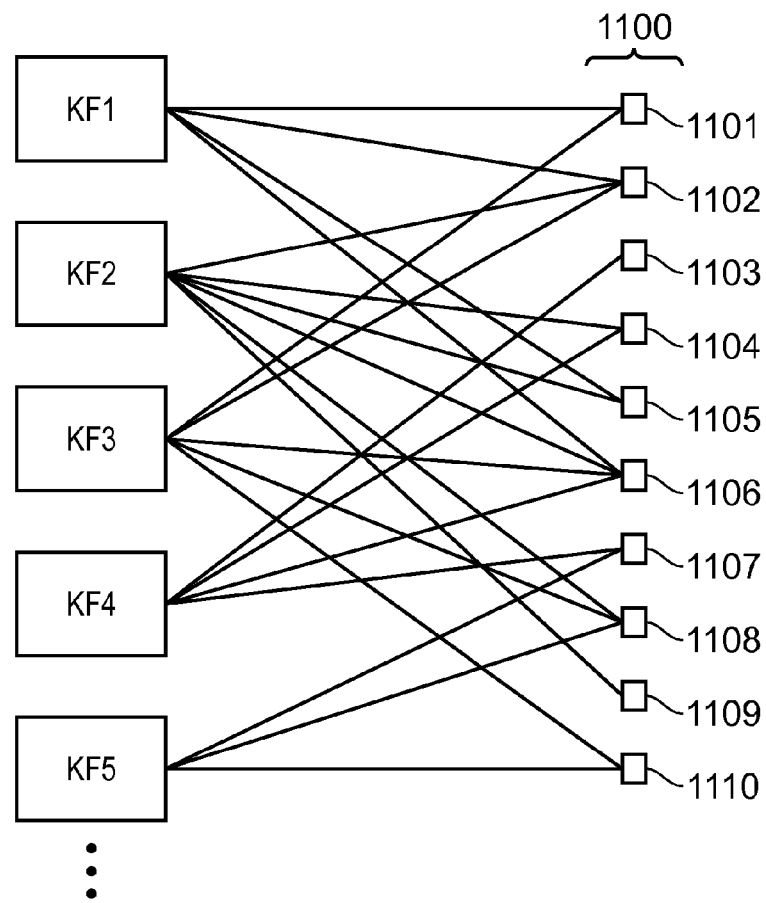
Figure 21:
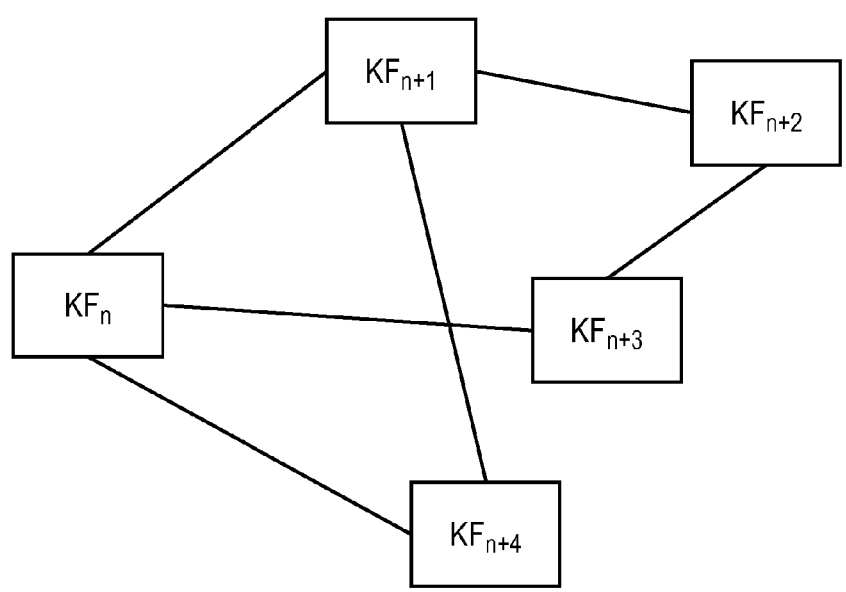
Figure 22:
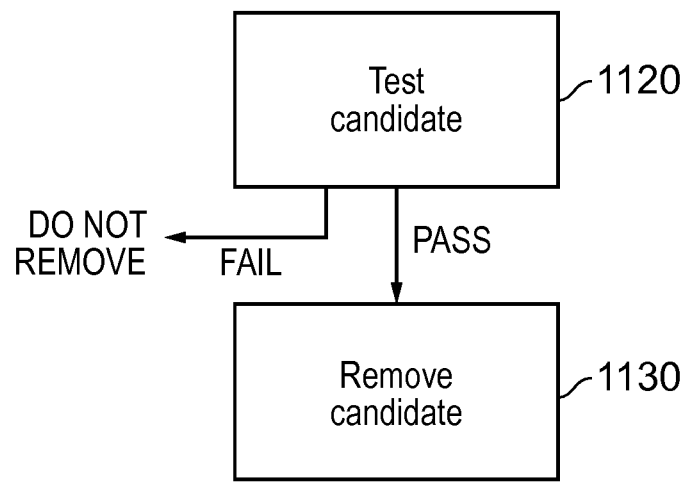
Figure 23:
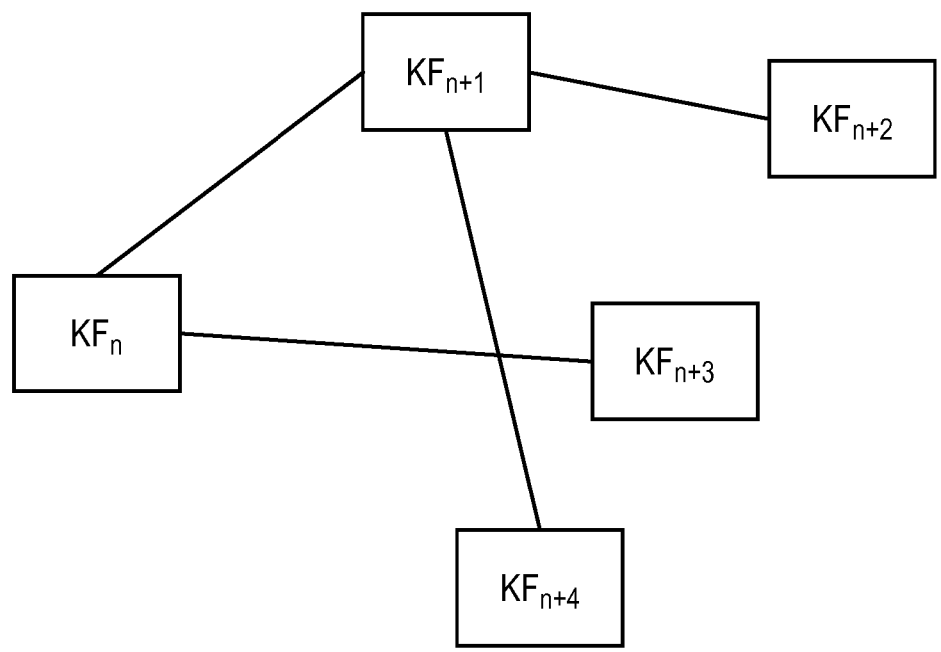
Figure 24:
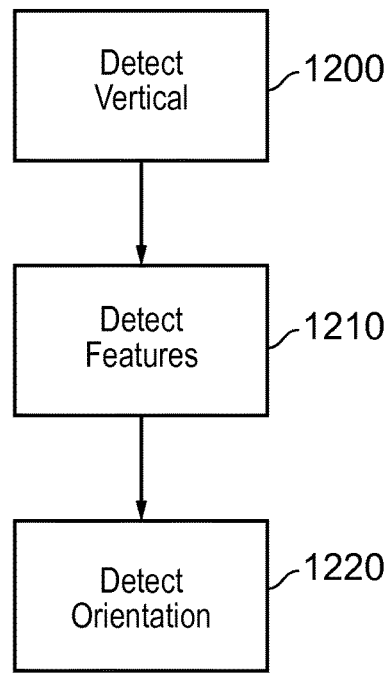
Figure 25:
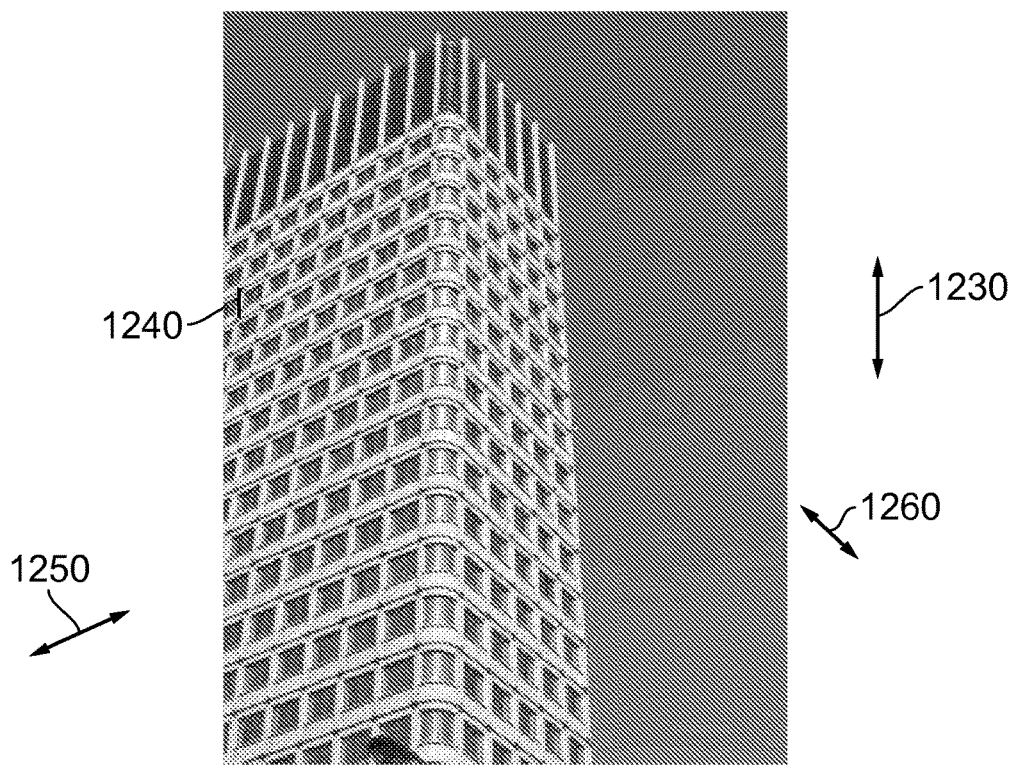
Figure 26:
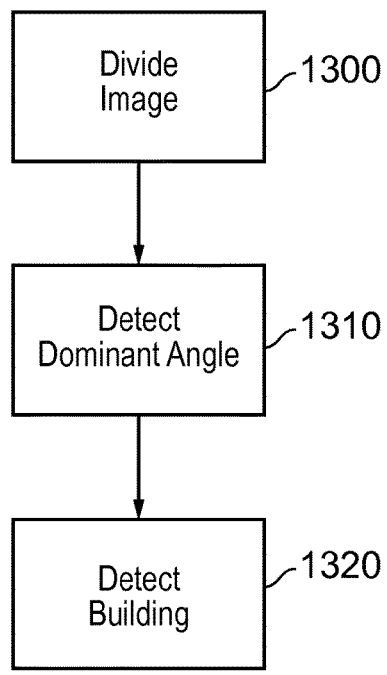
Figure 27:
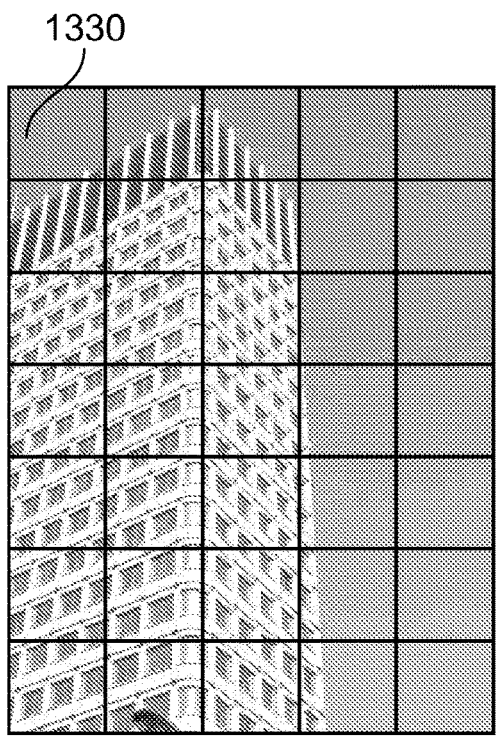
Figure 28:
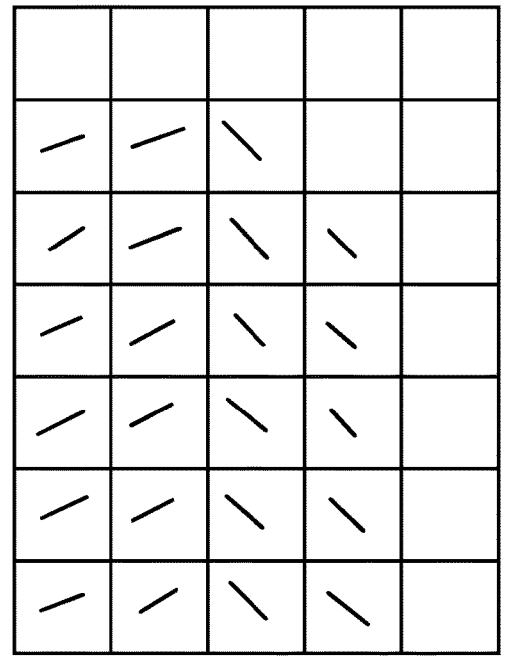
Figure 29:
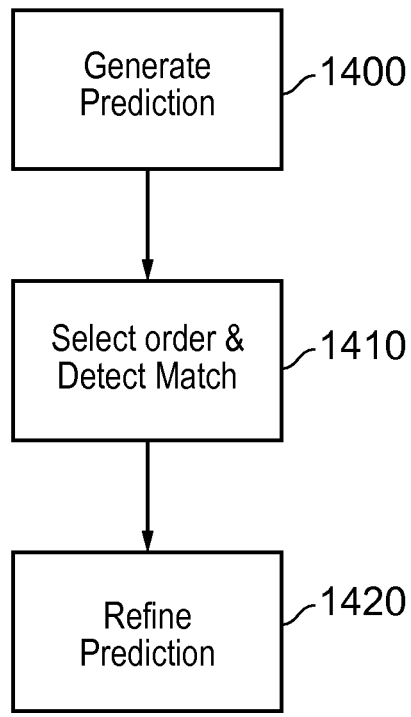
Figure 30:
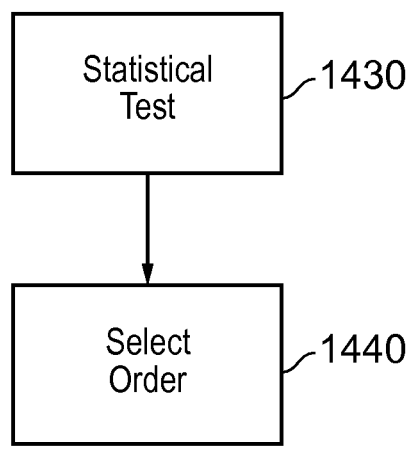
Figure 31:
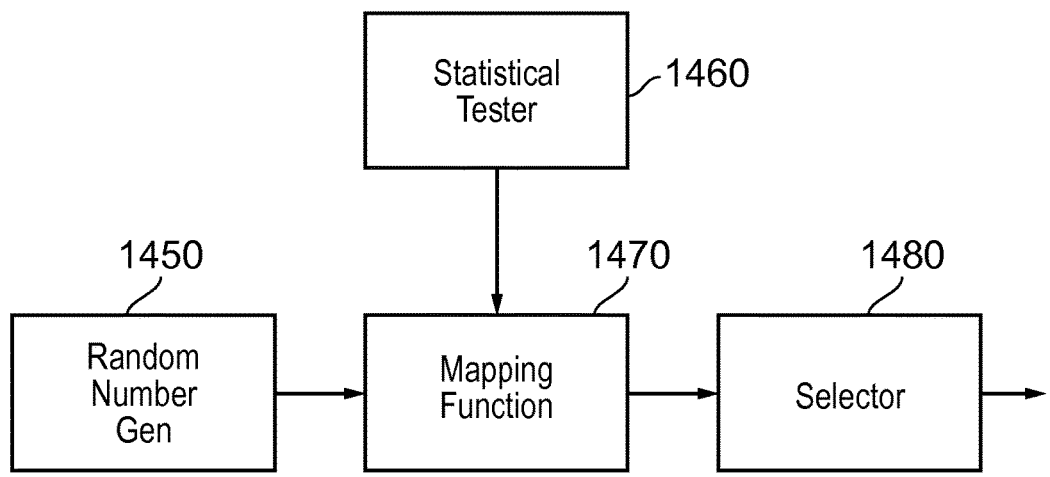
Figure 32:
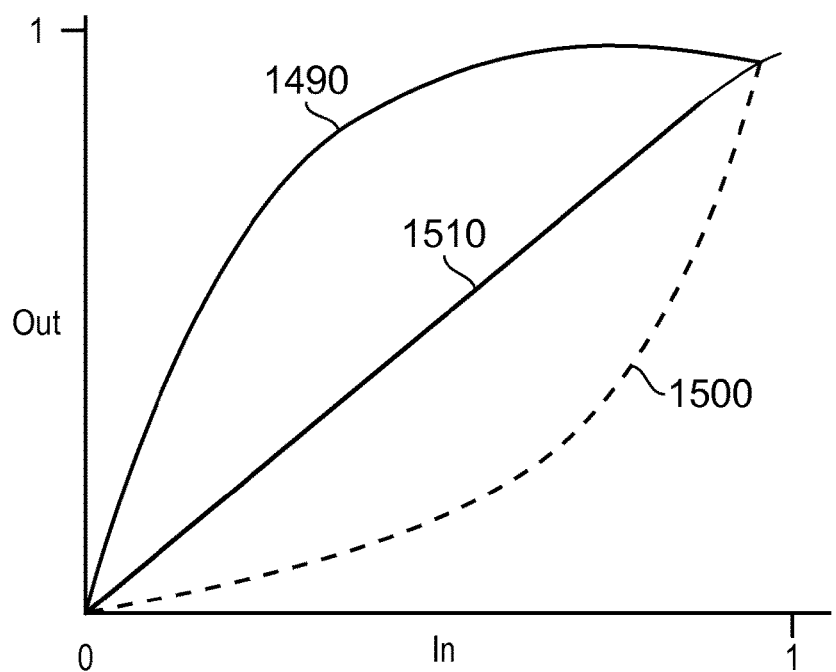
Figure 33:
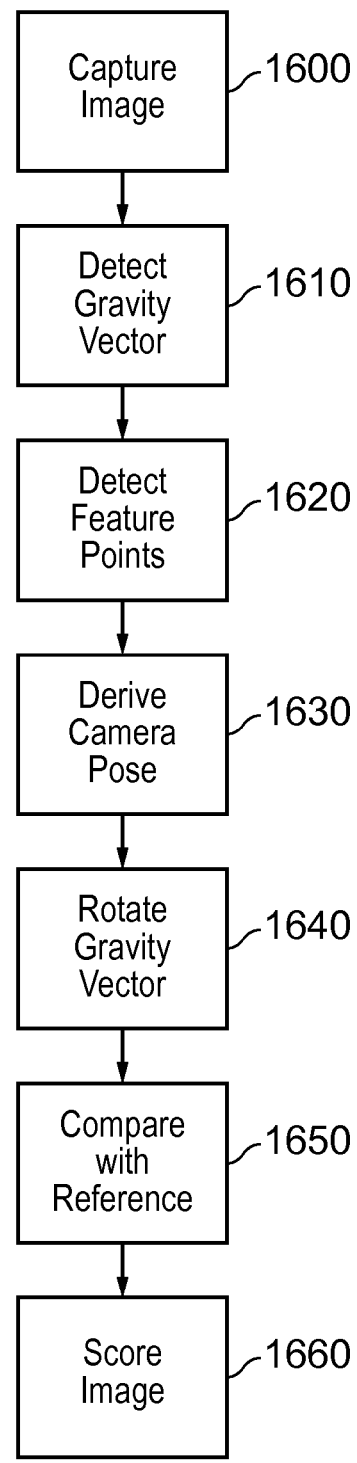
Figure 34:
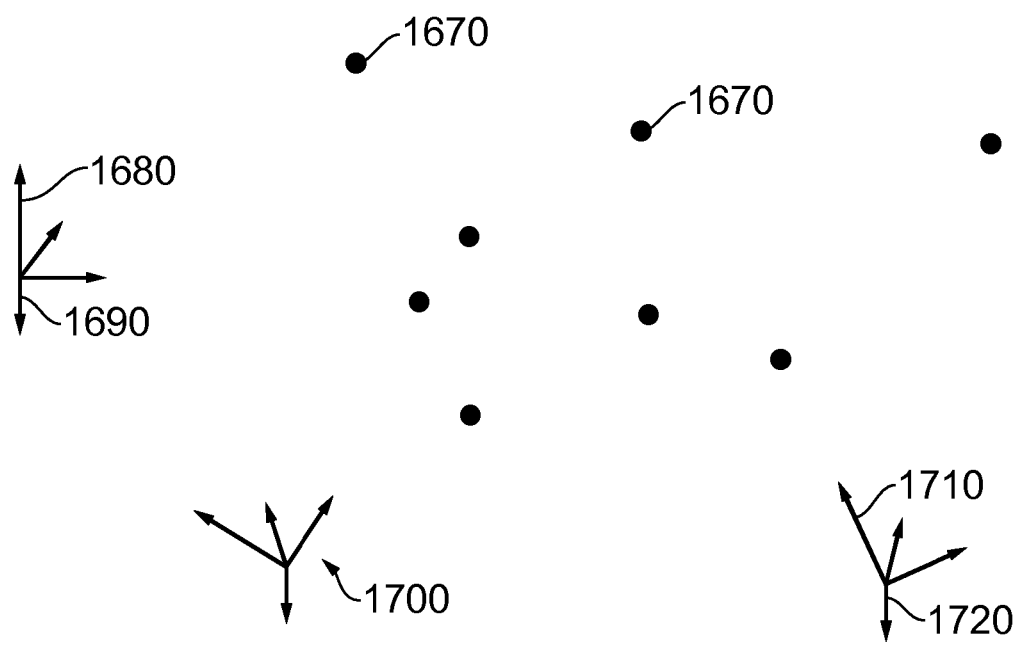
Figure 35:
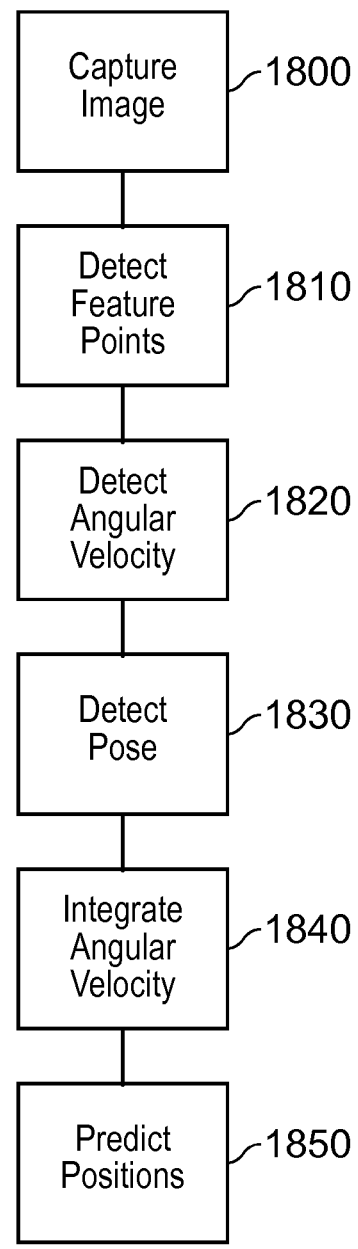

FIG. 10 schematically illustrates a search process;

FIG. 11 is a schematic flowchart of a process to add a new keyframe;

FIG. 12 is a schematic flowchart of a bundle adjustment process;

FIG. 13 is a schematic flowchart of a basic initialization technique;

FIG. 14 schematically illustrates the capture of a pair of images at an initialization stage;

FIG. 15 schematically illustrates a pair of images captured during an initialization stage;

FIGS. 16a-16e schematically illustrate a tracking process;

FIGS. 17a-17c schematically illustrate a process for adding points to a map;

FIG. 18 schematically illustrate a grid of image regions;

FIG. 19 is a schematic flowchart relating to the addition of points to a map;

FIG. 20 schematically illustrates an association between keyframes and landmark points;

FIG. 21 schematically illustrates a connections graph;

FIG. 22 is a schematic flowchart of a process for removing measurement data and/or keyframes;

FIG. 23 schematically illustrates a connections graph with a connection removed;

FIG. 24 is a schematic flowchart relating to a building orientation detection process;

FIG. 25 schematically illustrates the process of FIG. 24;

FIG. 26 schematically illustrates a building detection process;

FIGS. 27 and 28 provide schematically examples of the process of FIG. 26;

FIGS. 29 and 30 schematically illustrate a point order selection;

FIG. 31 schematically illustrates a mapping function and point selector;

FIG. 32 is a schematic graph illustrating a mapping function;

FIGS. 33 and 34 schematically illustrate a gravity detection technique; and FIG. 35 schematically illustrates an angular velocity detection technique.

GAMES MACHINE

Figure 1A:
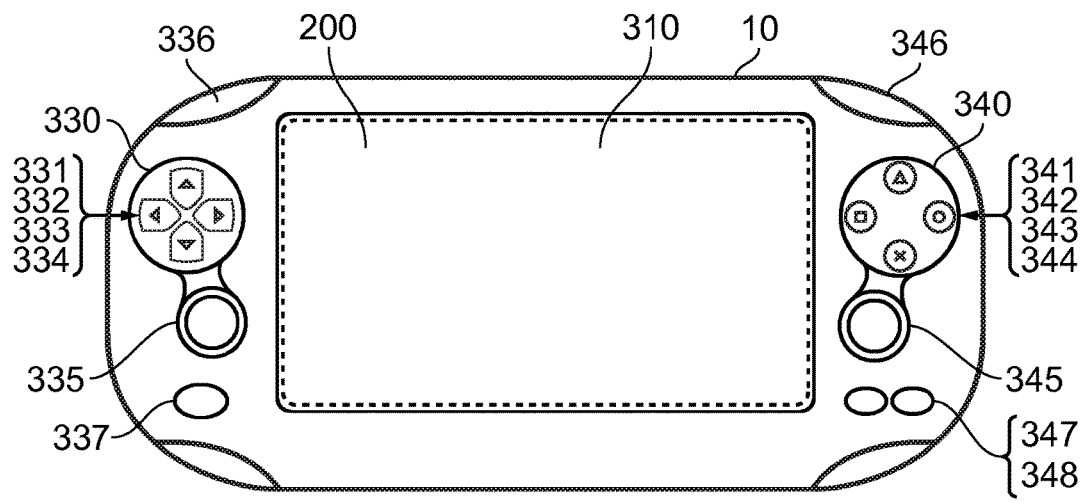
Figure 1B:
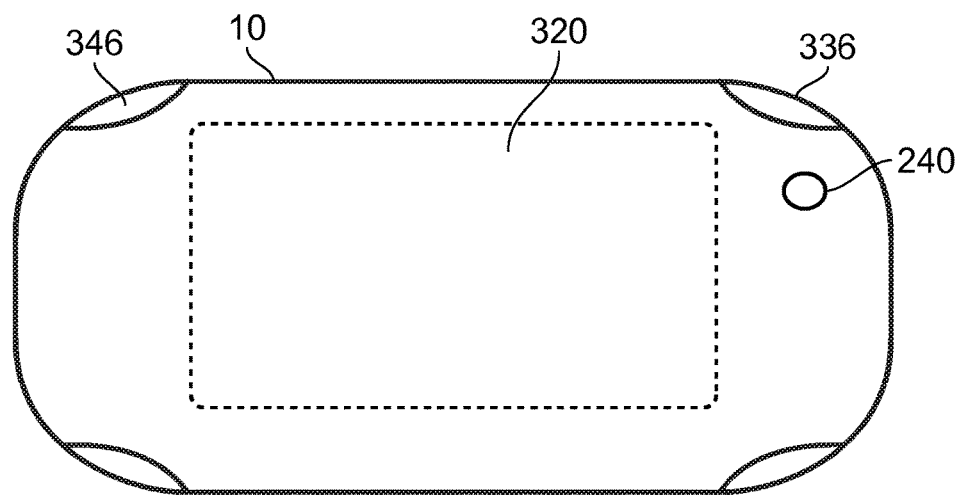

FIGS. 1A and 1B illustrate an embodiment of a portable entertainment device (PED) 10 such as the Sony® PlayStation Vita® (PSV) device, providing an example of a data processing device (and in particular a computer games machine) as an embodiment of the present invention.

FIG. 1A shows a notional front or top side of the PED, whilst FIG. 1B shows a notional rear or bottom side of the PED. The front and rear sides are substantially parallel to each other.

On the front side, the PED comprises a display 200 and optionally one or more loudspeakers (not shown).

In addition, the PED may comprise a number of physical controls. For example in FIG. 1A, a directional "joypad" 330 (a collection of user controls according to a layout which is familiar to many game machine users) is located to the left of the display and comprises four directional buttons 331-334, and is also located adjacent a first joystick 335. In addition a shoulder button 336 is provided at the top-left of the PED. Finally, a button 337 (for example a 'PS' button, where the initials PS signify a known operational meaning applied within some PlayStation games) may be provided, enabling a user to access the PED's operating system at any time.

To the right of the display, a function joypad 340 comprises four function buttons 341-344. These function buttons are differentiated by their icons, such as a triangle, circle, cross and square. The function joypad is located adjacent a second joystick 345. In addition a shoulder button 346 is provided at the top-right of the PED. Finally, two buttons 347, 348 may be provided, for example providing a 'start' function and a 'select' function.

In typical use, the sets of controls on the left and right side of the PED are used co-operatively by a single user to control a game. Such a typical usage may be to control positional movement of the player within a game environment using either the directional joypad or the left joystick, whilst controlling the direction of view, or a reticule or similar, using the right joystick. Meanwhile, in-game functions just as jumping, firing a weapon, blocking an attack or interacting with an object may be assigned to respective buttons of the function joypad. Meanwhile the shoulder buttons may be used either for less frequent functions, or may be used to provide alternate modes of operation (such as primary or alternate firing modes).

The buttons of the directional joypad and the function joypad may be differently shaped, with the buttons of the directional joypad shaped in response to their respective direction, whilst the buttons of the function joypad are generally identical in shape.

In an embodiment of the present invention, the PED comprises a rear touch sensitive surface 320 (indicated by the dotted lines), having similar dimensions and aspect ratio to the display 200. The rear touch sensitive surface is positioned so as to be substantially aligned with the display on the opposite side of the device.

Meanwhile, a transparent front touch sensitive surface 310 (indicated by the dotted lines) is also provided coincident with the display 200. The front and rear touch sensitive surfaces and the display thus have similar dimensions and placements on their respective sides of the device. The touch sensitive surfaces may also have a similar resolution of touch localisation.

The rear touch sensitive surface may be a conventional capacitance touchpad or panel such as that found in laptops. Such a touchpad typically comprises two layers of parallel conductive lines separated by an insulator and arranged at right angles to each other. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the touchpad. Meanwhile, movement of a user's finger or fingers can be estimated from successive points of intersection where contact is detected.

The front touch sensitive surface for use with the display operates in a similar manner to the rear touch sensitive surface, but in this instance the conductive lines are typically transparent (as a non-limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

FIG. 1B also shows the lens of a rear facing video camera 240, which will be discussed further below.

Figure 2:
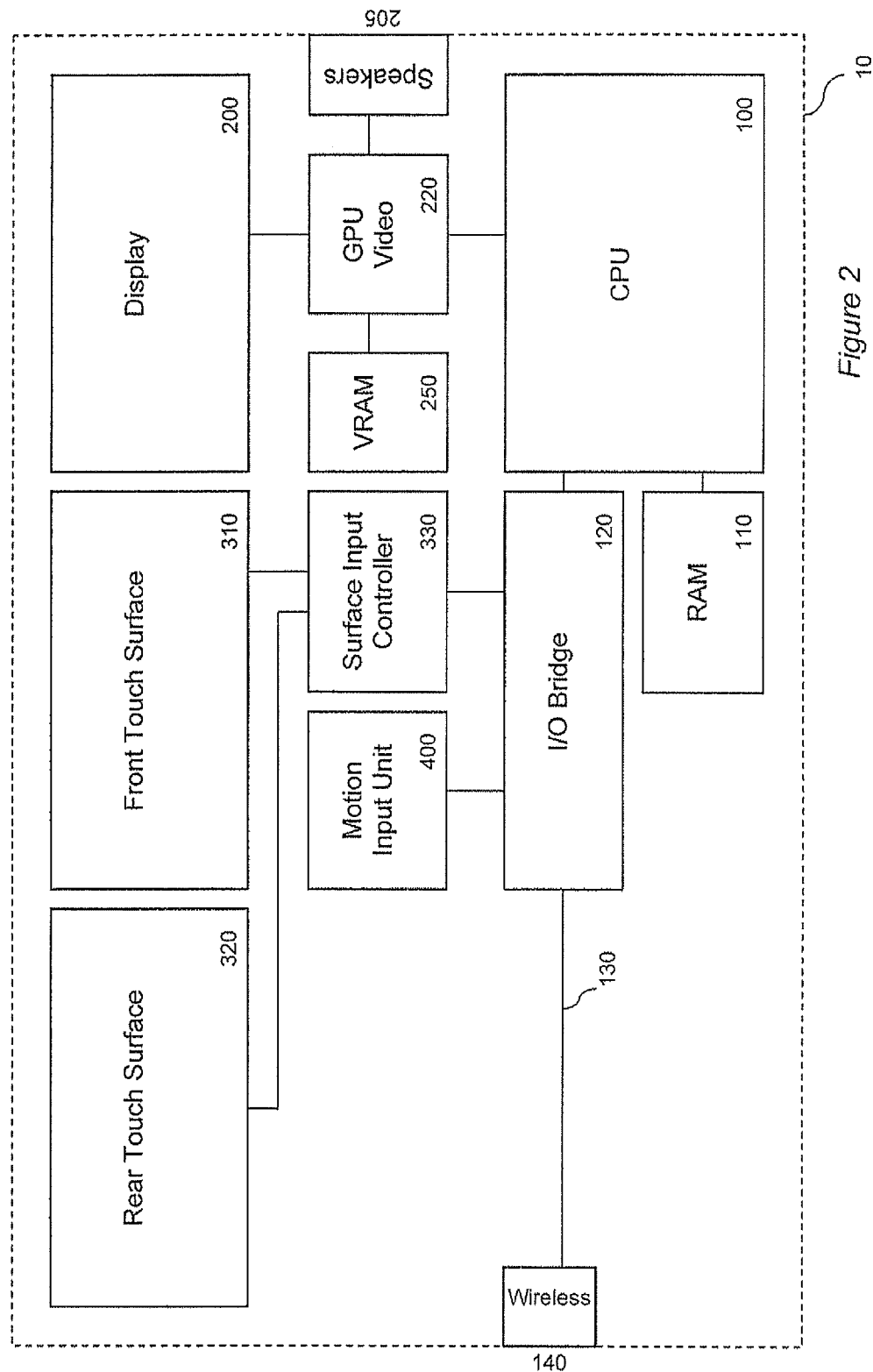

Referring now also to FIG. 2, an embodiment of the PED comprises a central processor (CPU) 100, such as the ARM® Cortex-A9 core processor, coupled to random access memory (RAM) 110 (for example 512 megabytes (MB) of RAM), and optionally to a read only memory (ROM) (not shown). In addition the CPU communicates with a graphics processing unit (GPU) 220. The GPU has access to video RAM (VRAM) 250 (for example 128 MB of VRAM). The GPU outputs video information to the display 200. The display is typically an OLED display, but may be a conventional liquid crystal display (LCD) or any suitable display technology. As a non-limiting example the display may have a resolution of 950×544 pixels. The GPU also outputs audio to loudspeakers 205 and/or to a headphone jack (not shown).

In addition, the CPU communicates with an input/output bridge (I/O bridge) 120 that co-ordinates communication with peripheral components both integral to and linkable with the PED. In an embodiment of the PED the I/O bridge 120 communicates with a surface input controller 330, which parses inputs from the rear touch sensitive surface and the transparent front touch sensitive surface where provided. The I/O bridge also communicates with an optional motion input unit 400 comprising one or more micro electromechanical (MEMS) accelerometers and/or gyroscopes, to provide up to six axes of motion input (x, y and z axis lateral movement and roll, pitch and yaw rotational movement). At a low level it may be considered that the accelerometer measures the device acceleration (including gravity) in the X, Y, Z directions expressed in an IMU (inertial measurement unit) reference system. Assuming a low device acceleration compared to gravity, two absolute rotational angles can be computed from the gravity vector. Higher user accelerations of the device reduce the accuracy of the computed angles as gravity is corrupted by the extra user acceleration. The gyro part instead, measures the device angular velocity expressed in IMU reference system and so is mostly useful for providing relative rotation information. Note that some embodiments of the invention relating to initialization on buildings rely on the gravity vector reported by the accelerometer and so in this particular context MEMs (or IMU) are not optional. The I/O bridge also receives input from the physical controls (buttons and joysticks) shown in FIG. 1A, optionally via an input control logic (not shown). Finally, the I/O bridge communicates with a bus 130, upon which various peripheral devices may be linked, including one or more wireless communication units 140, such as for example 3G, WiFi (such as IEEE 802.11b/g/n), and/or Bluetooth® units.

It will be appreciated that the CPU 100 may be a single core or multi core processor, such as the ARM® Cortex-A9 core (having 4 cores). Similarly, the RAM may be dynamic RAM or may comprise both dynamic RAM and static (flash) RAM units. Likewise, whilst the GPU typically uses dedicated VRAM, alternatively or in addition it may share common RAM with the CPU. Finally, it will be appreciated that the function of the surface input unit may be performed by the CPU itself.

It will also be appreciated that whilst not shown in the figures for the purposes of clarity, the PED comprises an array of switches aligned with the buttons described previously, and also two joystick input mechanisms, each of which is able to provide input to the I/O bridge, optionally via an input control logic (not shown). Similarly not shown, the PED also comprises power distribution lines to various components and one or more sources of power, such as an input socket (for example a conventional DC power socket, or alternatively or in addition a USB socket, not shown). Such an input socket may also be used to charge one or more batteries (also not shown). Such batteries may be user removable or may be sealed in the device. Other components not shown include, for example, an optional microphone.

Figure 3:
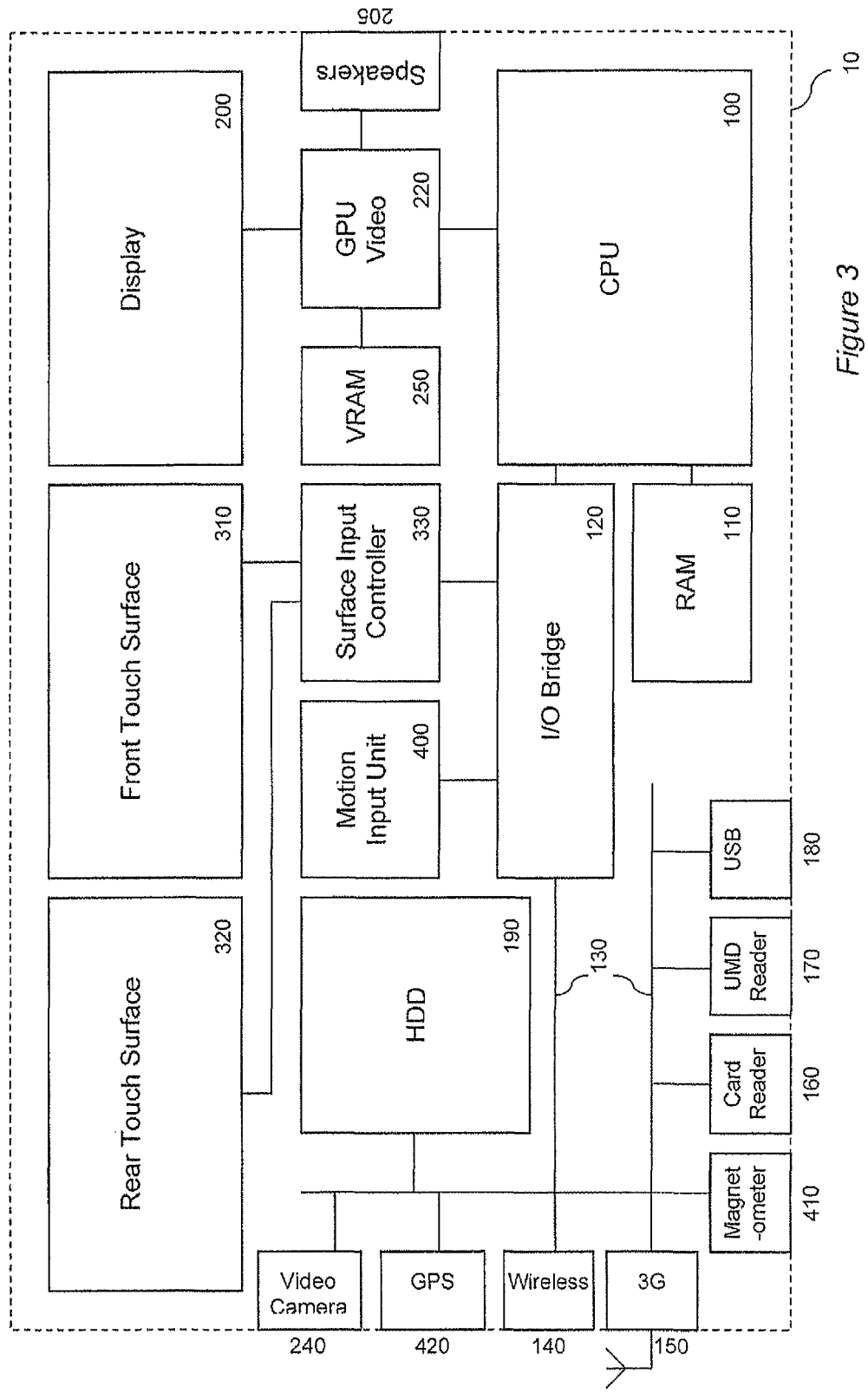

Referring now also to FIG. 3, an embodiment of the PED may comprise one or more additional components, either integrated within the device or connectable to it. The additional components include, but are not limited to, the following.

a) A card reader 160 suitable for reading from and optionally writing to memory cards, such as the Sony® Memory Stick®, or alternatively legacy memory cards such as those used by the Sony® PlayStation 2® entertainment device. Such a reader may be integral to the PED or connect to the bus 130 via a USB port 180.

b) A universal media disk (UMD) reader 170 or other optical disk reader (such as DVD or Blu-Ray®), for accessing media and/or game content stored thereon. Such a reader may be removably connectable to the bus 130 via a USB port 180 or proprietary connection.

c) A magnetometer 410 for determining compass direction, mounted integral to the PED either on the bus 130 or as part of the motion input unit 400. A gravity detector (not shown, though note that the accelerometer is a "gravity detector") may also be included to determine the direction of gravity, either as part of the magnetometer or as a separate component.

d) A third generation (3G) or other mobile telephony and/or mobile data communication module 150. In an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via a USB port 180 or a Personal Computer Memory Card International Association (PCMCIA) slot (not shown).

e) A hard disk drive (HDD) 190 integral to the PED, providing bulk storage for audio/video media, downloaded games, and the like.

f) A GPS receiver 420. Again the GPS receiver may share an aerial with one or more other wireless units (such as WiFi) within the PED. Map information, where used, may be stored locally at the receiver, or in flash RAM of the PED, or on an HDD of the PED.

g) One or more video cameras 240, typically each comprising a charge coupled device (CCD) optical sensor and suitable optics for imaging onto the CCD. The resolution of the CCD may for example be 640×480 pixels, but may be any suitable resolution, such as for example 1920×1080 pixels (full HD). The effective resolution may vary with frame capture rate. In an embodiment the or each video camera is integral to the PED (for example with one mounted on each of the front and rear surfaces, so providing a forward facing camera and a rearward facing camera), but alternatively may be removably connectable to the bus 130 via a USB or proprietary connection. An embodiment of the PED comprises two such video cameras 240 on one surface, thereby forming a stereoscopic pair.

In operation, the CPU accesses an operating system that is resident for example on a built-in ROM, flash RAM or a hard disk. The operating system co-ordinates operation of the various functions of the PED and presents a user interface to a user of the device. The user interface will typically comprise graphical outputs via the display and touch based inputs, but may also include audio outputs and/or motion-based inputs, and/or inputs from the various physical controls of the device.

The touch based inputs to the PED can be peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point on the panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the rear touch panel can be understood to represent the screen (i.e. act as a proxy).

Notably, because of the relative orientation of the display and the rear touch panel, left-to-right mapping across the rear touch panel is therefore reversed to correspond to left-right mapping as seen from the front, so as to allow pointing to the appropriate position on the display. Optionally this reversal is switchable depending on the orientation of the device as detected by the motion input unit, and/or according to what peripheral devices are connected; for example if the PED were connected to a television and then held display-down for use, the left-to-right mapping of the touch panel input may not be reversed.

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with the similar but transparent front touch sensitive surface overlaid on the display, further modes of interaction become possible. For example, objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to each other may be interpreted as a twisting action, and adjusts a virtual volume dial. A similar grammar of interaction can be used for example for document or e-book navigation, with scrolling, page selection and zoom replacing the above playback functions.

The use of the apparatus described above in respect of the localisation and mapping of points in captured monoscopic images defining planes onto which augmented reality (AR) images may be rendered, will now be described. The camera 240 and the display 200 are relevant to the description which follows, with the various processing steps being carried out (for example, under appropriate software control) by the CPU 100. It will be appreciated that such software and the methods carried out by such software are considered to represent embodiments of the present invention. It will also be appreciated that a storage or other providing medium, such as a non-transitory machine-readable storage medium (examples being a non-volatile memory, a read-only memory, a magnetic disk, an optical disk or the like), by which such software is provided or stored, are also considered to represent embodiments of the present invention.

Embodiments of the invention can provide computer games apparatus comprising: image processing apparatus (such as the PED operating under appropriate software control) and an image renderer operable to render an image for display by combining a captured image with one or more computer-generated image portions generated with respect to detected features in the captured images. Such a machine may include the camera 240 operable to capture the images. The computer generated image portions can be generated as part of game execution by the PED and can be arranged to form a so-called augmented reality display so that the position, nature and/or orientation of the computer-generated image portions matches, aligns with and/or complements that of the real features in the captured images.

Figure 4:
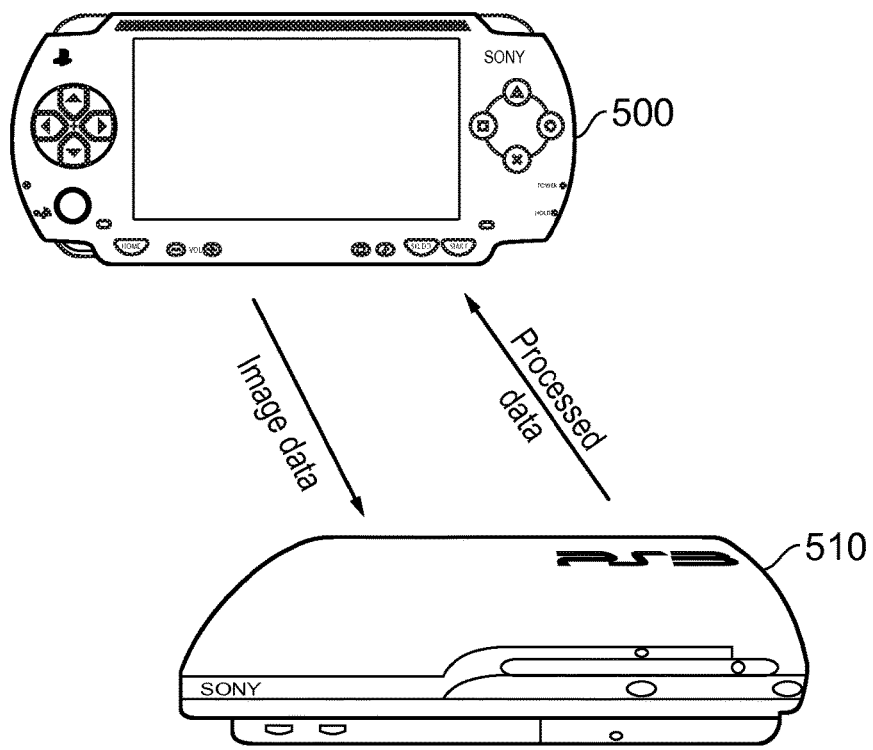

It will also be appreciated that at least some of the processing operations may be passed, by the PED, to another device such as a host computer or games console for processing, with the results of such processing being transferred back to the PED. In embodiments of the invention, this could be carried out by communication over a wireless communications link. For example, referring to an example arrangement shown schematically in FIG. 4, a PED 500 could capture image data and pass the image data (in a compressed form, for example) to a games console 510 where at least some processing of the images takes place. For example, the derivation of a 3D map of the environment (see the description below) could be carried out at the games console 510. The results of the processing (for example, map data) are passed by the games console back to the PED 500. Possible reasons for handling the data processing in this cooperative manner include the fact that it can save on processing resources and/or battery life at the PED, by using a more powerful (and potentially mains-powered) device to handle some of the processing.

Figure 5:
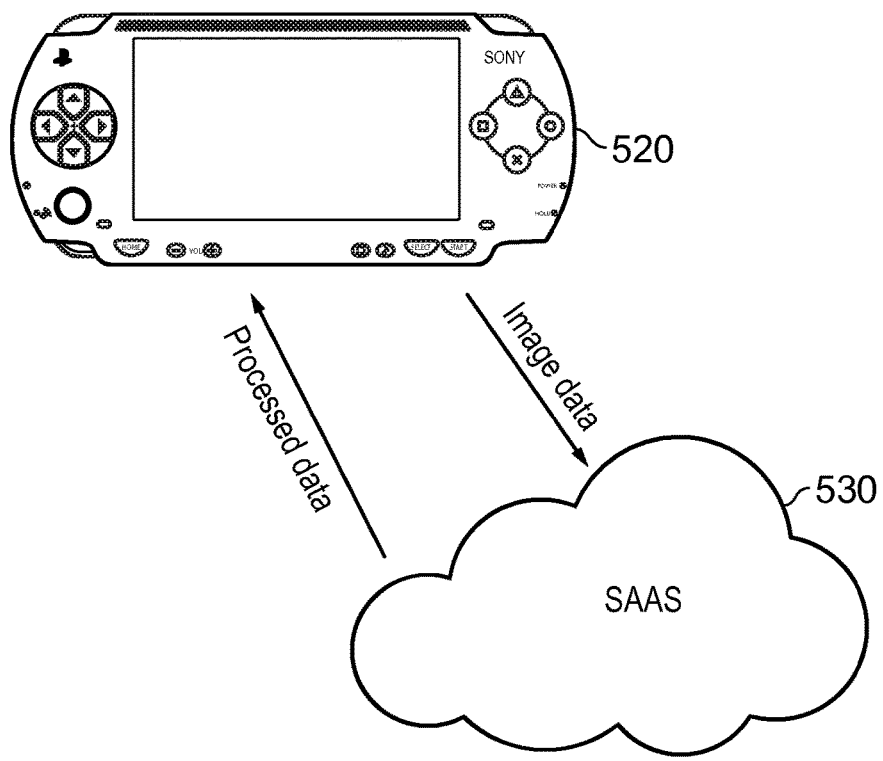

A similar effect can be achieved by a PED 520 using a cloud-based processor 530 (indicated by the initials SAAS, signifying "software as a service") in place of (or in addition to) the games console 510. Such an arrangement is illustrated schematically in FIG. 5.

Overview of Tracking and Mapping

Before discussing the processes in detail, some terminology will be introduced.

A "map" is a set of "landmarks". A landmark is a 3 dimensional (3D) position in space, plus an image patch (or image information). An image patch is a small area of image data (small in comparison with the number of pixels in a whole image) indicating the appearance of that landmark, for example as viewed from the first keyframe in which the landmark was identified. However, note that in some embodiments to be discussed below, tracking can be undertaken on the basis of the landmarks in the map and also non-bundle-adjusted points not forming part of the core map.

A keyframe is a camera "pose" (a camera position in 3D space, plus a camera orientation relative to the coordinates of the 3D space) plus a set of measurements or image position data where each of a subset of the landmarks has been observed in that keyframe.

"Bundle adjustment" is a process of optimisation (or at least attempted improvement) across a group of two or more keyframes by attempting to reduce the total or net "reprojection error" by changing the camera poses associated with the keyframes, and/or by adjusting the 3D positions of the landmarks. Local bundle adjustment takes place with respect to a subset of the keyframes, such as the most recently added n keyframes (where n could be, for example, 5-10). Global bundle adjustment is a rather slower process, requiring more processing resources, which applies bundle adjustment to all of the keyframes. An effect of bundle adjustment can be to promote or convert non-bundle-adjusted points into landmark or bundle-adjusted points.

The reprojection error is the sum of the squares of differences between the 3D positions of landmarks and the corresponding predicted positions obtained from the keyframe pose and the keyframe measurement for that landmark.

Figure 6:
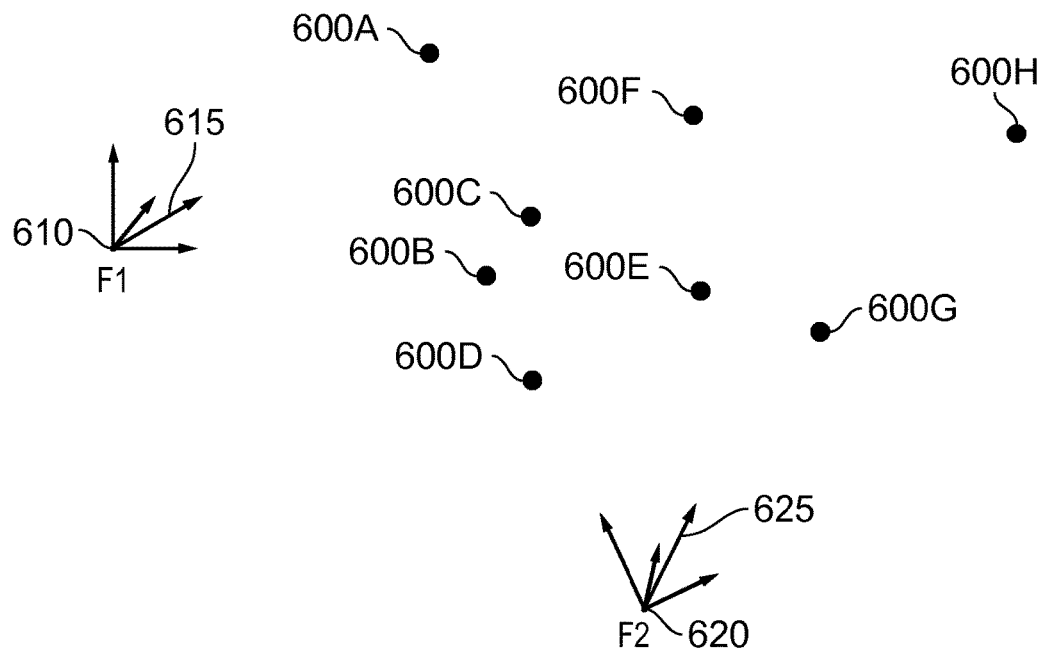

To illustrate some of these concepts further, FIG. 6 schematically illustrates a set of landmarks (labelled as numerals 600A . . . 600H) and two camera poses F1, F2. Each camera pose comprises a camera position 610, 620 and a camera orientation 615, 625 relative to a local coordinate frame (illustrated schematically as three orthogonal axes in each case). Although, for practical reasons, for FIG. 6 is drawn in two dimensions, it represents a three-dimensional situation and should be viewed in that context.

In a tracking and mapping system, images of the a scene in three-dimensional space are captured from different viewpoints. Points are identified in the captured scenes and are associated with one another in the sense that the image position of a particular three-dimensional point as captured in one image is associated with the image position of that three-dimensional point as captured in another image. The basis of the tracking of mapping system involves deriving, from this information associated points in one image with points in another image, and internally consistent set of data defining the respective camera poses and the three-dimensional positions of the points. In order for that set of data to be internally consistent, it should lead to a consistent set of three-dimensional positions, and in respect of a particular image, it should lead to a consistent relationship between the camera pose for that image and the expected (and actual) image positions of points as captured by that image.

Figure 7A:
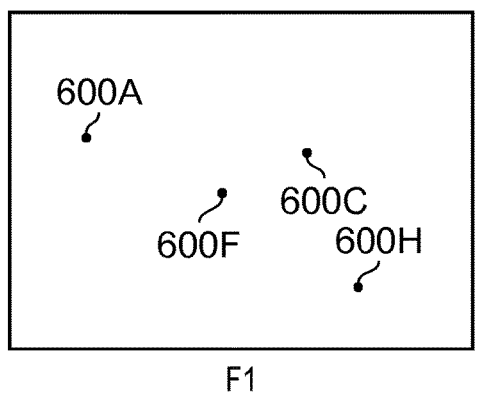
Figure 7B:
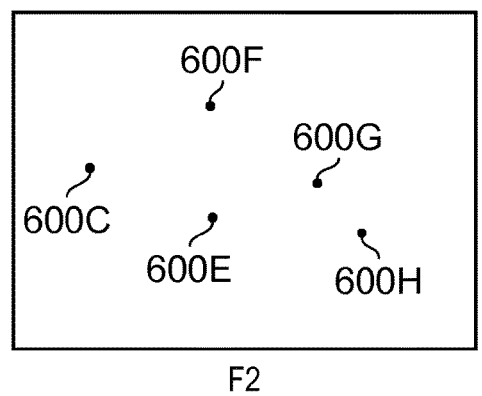

FIGS. 7a and 7b are schematic representations of images captured by the cameras at positions F1 and F2. In each case, some of the points 600A . . . 600H can be seen in the captured images. If the set of data discussed above is internally consistent, the actual image positions of these points will correspond to the image positions predicted from the camera pose and the three-dimensional positions derived for those points.

Figure 8:
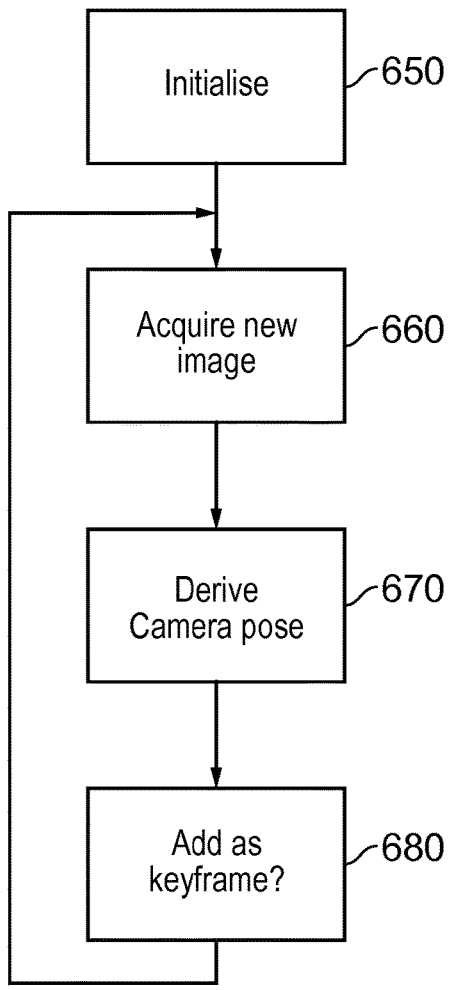
FIG. 8 is a schematic flowchart giving an overview of a tracking and mapping process.

FIG. 8 is a schematic flowchart giving an overview of a tracking and mapping process.

The example process starts from no advanced (a prion) knowledge of either the camera poses all the spatial position of features to be captured by the camera images. Accordingly, a first stage is to initialize the system at a step 650. Initialization will be discussed in more detail below, but basically involves deriving an initial set of map data which can then be refined further as the process continues.

A loop operation then follows, comprising the steps of acquiring a new image (for example, at an image capture rate such as 15 images per second, 30 images per second, 60 images per second or the like) at a step 660, deriving a camera pose from the map and the newly acquired image at a step 670 and, potentially, adding the newly acquired image as a keyframe at a step 680. Note that although the step 680 is shown in this example as forming part of the basic loop of operation, the decision as to whether to add an image as a keyframe could be separate from this basic loop.

Figure 9:
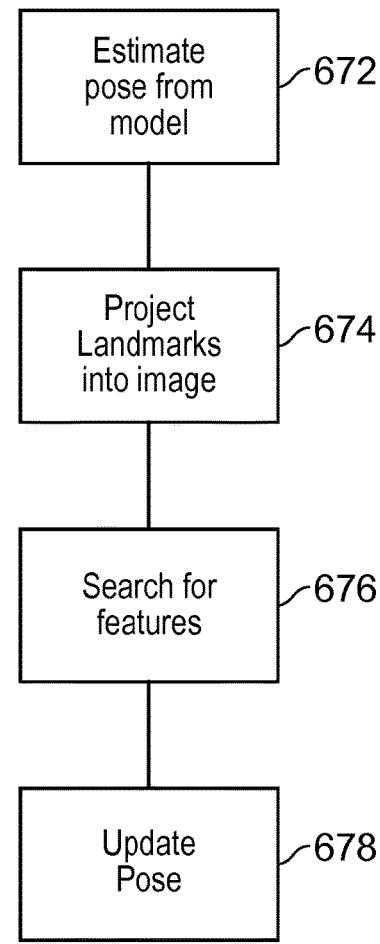
FIG. 9 is a schematic flowchart of a camera pose derivation process.

FIG. 9 is a schematic flowchart of operations carried out as part of the step 670 of FIG. 8. These operations are performed to derive a camera pose from a newly acquired image and the map data.

As a step 672, the system first estimates a prediction of a camera pose in respect of the newly acquired image from a model. The model could be embodied as a position tracking filter such as a Kalman filter, so that a new camera pose is extrapolated from the recent history of changes in the camera pose. In another example, the model could make use of sensor data such as gyroscopic or accelerometer data indicating changes to the physical position and orientation in space of the device on which the camera is mounted. However, at a very basic level, the new camera pose could be estimated simply to be the same as the camera pose derived in respect of the preceding captured image.

At a step 674, the landmarks are projected into corresponding positions in the captured image based on the initial estimate of the camera pose. This gives an image position for each landmark (or a subset of landmarks under consideration) where the landmark is expected to be seen in the newly captured image. At a step 676, the system searches for image features corresponding to the landmarks. To do this, a searches carried out for image features which relate to or correlate with the image patches associated with each landmark. The search is not only carried out at the exact predicted position, but also at a range of positions near to the predicted position. Finally, at a step 678 the estimated camera pose for that image is updated according to the actual detected positions of the landmarks in the captured image.

Note that in the description of FIG. 9 given above, reference has been made to deriving a pose for a current image from landmark (bundle-adjusted) points. However, in embodiments to be discussed below, a camera pose may be derived on the basis of bundle-adjusted points and non-bundle-adjusted points as well. In such a case, the above example description applies, just with the new cohort of points substituted for references to landmark points. Such an arrangement provides for a flexibly adaptive system, in that new non-bundle-adjusted points can be added at any image, so that the map can adapt to new environment features present in the captured images.

FIG. 10 schematically illustrates a search process relating to a newly captured image 690. Taking one landmark as an example, the step 674 generates a predicted image position 692 for that landmark. The system searches for image data which relates to all correlates with the image patch associated with that landmark in a search area 694 associated with (for example, surrounding) the predicted position 692.

FIG. 11 schematically illustrates the step 680 in more detail. As discussed above, this step may form part of a basic loop of operation or may be carried out separately, for example by a separate processing thread or as one operation of a separate processing thread.

When the map is initialized at the step 650 (discussed further below), it contains a relatively small number of key frames such as two keyframes. It is appropriate to add further keyframes as the system proceeds, for at least two reasons. The first is that as the camera moves in space, new image features will be captured and previously captured image features will disappear from view (because they are outside of the field of view of the camera and/or because they are obscured by intervening features). So, in order to have keyframes available which refer to the set of image features which may be appropriate to a newly captured image, new keyframes are added to the set of keyframes from time to time. A second reason is simply to improve the accuracy by which the map data is derived, by allowing for more keyframes to be used in the derivation or refinement of the map data.

In basic terms, keyframes can be added when one or more conditions are met in respect of a newly captured image under consideration. These conditions are illustrated schematically in FIG. 11.

At a step 682, a quality test is carried out. This involves a detection of the current tracking process is applied in respect of the newly captured image. In one example, the quality test relates to a predicted error in the camera pose derived for a newly captured image from the existing map, such that the quality test is passed if the predicted error is lower than a threshold error.

At a step 684, a temporal separation test is carried out. A new keyframe should be separated in time (that is, separated by at least a threshold number of captured images) from a preceding keyframe. An example of a threshold number is 20 images.

At a step 686, a spatial separation test is carried out. In order to provide a useful addition to the process, a new keyframe should relates to a camera pose which is spatially and/or angularly separated from the camera poses of the other existing keyframes by at least a threshold separation. This is because the derivation of three-dimensional positions for the landmarks relies on parallax between different keyframe images, so if the camera poses for a pair of keyframes are very similar, the parallax will be low and the error involved in the three-dimensional positions will be fine. So, a minimum parallax is required for a new potential keyframe to be a useful addition to the set of keyframes. In other words, this involves detecting whether the feature points in the captured image represent a view which is sufficiently different to that of the corresponding landmark points as to allow triangulation of a respective position from the feature points and the corresponding landmark points.

Accordingly, criteria for a captured image to be a keyframe include that the tracking quality for the image is above a certain level, that the number of captured images since the last key-frame is more than a predetermined value and that the pose of the camera at which the image is captured is a certain distance from the pose of the camera for key-frames that have already been established.

A further criterion may be applied, which is to detect whether at least a threshold number of feature points within that captured image correspond to landmark points for which one or more keyframes in the set of keyframes have associated measurement data (a positive detection being required for a keyframe to be selected).

Other criteria or tests may also be applied.

The tracking quality may be determined by the proportion of projected points for which a successful search template pixel match is achieved in an image. A threshold proportion may be set so that if a match is achieved for less than threshold proportion of projected points, then the pose of the camera is deemed not to have been determined to a high enough accuracy for the captured image to be used as a key-frame. It is important that the pose of the camera for new key-frames is determined as accurately as possible so that locations of new corner points detected in the key-frame and added to the world map are as accurate as possible. The threshold proportion may be set at 50%, 60% or 70%, for example. Note that embodiments of the invention can use data from a gyroscopic sensor to change this threshold.

The number of captured images since the last key-frame is set at a value such that a sufficient amount of time is available for processing of each key-frame and adding new points to the map before a new key-frame needs to be processed. This allows new points to be added to the map in real time as the camera explores new areas of the scene. The number of captured images between key-frames could be 20 images, for example, though in embodiments of the invention there is no limit on the number of images between key-frames. The number of captured images between key-frames can be made to vary depending on the mean distance of existing corner points from the camera. Specifically, key-frames can be created more frequently if the existing corner points are near to the camera (resulting in rapid changes of the content of captured images as the camera is moved) and less frequently if the existing corner points are further from the camera (resulting in slower changes of the content of the captured images as the camera is moved).

The pose of the camera associated with a new key-frame should be such that it is at least a certain distance from the pose of the camera associated with any existing key-frame. This is to ensure that keeping the camera stationary does not result in multiple key-frames of same image, which can lead to the map becoming corrupted, and ensures that there is a stereo baseline between key-frames for the triangulation of new corner points.

FIG. 12 schematically illustrates an overview of a so-called bundle adjustment process. As mentioned above, bundle adjustment is a process of optimisation (or at least attempted improvement) across a group of two or more keyframes by attempting to reduce the total or net reprojection error by changing the camera poses associated with the keyframes, and/or by adjusting the 3D positions of the landmarks.

Local bundle adjustment takes place with respect to a subset of the keyframes, such as the most recently added n keyframes (where n could be, for example, 5-10). Global bundle adjustment is a rather slower process, requiring more processing resources, which applies bundle adjustment to all of the keyframes.

The mathematics behind optimisation of data dependent on multiple variables are established and do not necessarily lend themselves to a convenient summary in a flowchart, but at a schematic level the process involves, at a step 700, detecting the re-projection error in respect of the camera poses associated with the keyframes subject to the bundle adjustment process and the three-dimensional positions of the landmarks. As mentioned above, the reprojection error is the sum of the squares of differences between the 3D positions of landmarks and the corresponding predicted positions obtained from the keyframe pose and the keyframe measurement for that landmark. If the camera pose associated with each of the keyframes under consideration and the three-dimensional positions of the landmarks as seen in those keyframes are entirely correct (or at least, entirely self-consistent) then the re-projection error will be zero. A more normal situation is that there is a non-zero re-projection error, and so an iterative process is performed of adjusting the camera pose(s) and/or landmark position(s) (at a step 720), detecting the re-projection error again (at the step 700) and continuing the process (at a step 710) until a minimum value of the re-projection error is obtained or until a predetermined number of iterations has been performed, or until a predetermined time has elapsed.

In summary, bundle adjustment involves, in respect of the keyframes, generating bundle-adjusted landmark points by iteratively refining the three dimensional spatial positions of the landmarks and the camera pose data associated with at least a subset of the keyframes by: (i) deriving a difference between the measurement data for landmark points in the keyframes and corresponding image positions obtained from the camera pose data and the three dimensional spatial position of that landmark point; and (ii) adjusting one or both of the camera pose data for one or more keyframes and the three dimensional spatial position of one or more landmark points so as to reduce the detected difference. In embodiments, the adjusting step comprises: deriving a statistical model of the three dimensional position of the landmark points and the camera pose; and discarding one or more landmark points which have below a threshold fit to the statistical model.

The points which are detected by the tracking and mapping process can be considered as different categories. So-called landmarks can be considered as the most stable points relating to a core map, and can be referred to as bundle-adjusted points. Points start as non-bundle-adjusted points when they are first detected as being present in two or more images so as to allow an initial depth triangulation. At a greatest level of initial uncertainty, a point may be referred to as an initial approximation as a 6D point as its position is subject to six degrees of freedom. A 6D point can be promoted or converted to a 3D point (while still remaining a non-bundle-adjusted point) as its position in space becomes more closely defined. At bundle adjustment, a non-bundle-adjusted point can be added to the core map and converted or promoted to a bundle-adjusted point.

So-called 3D points are derived by Kalman filtering, for example. So-called 6D points are created by the combination of Gaussian depth distributions. A 6D point can be promoted or converted to a 3D point when the depth uncertainty has shrunk to below a threshold uncertainty. A 3D point can be promoted or converted to a core or bundle-adjusted point at a key-frame using a so-called bundle adjustment process. But in general, new points can be added (initially as 6D points, for example) at any frame, and all of the points can be used for tracking. In some embodiments of the invention, 3D points can be promoted to call points at any frame.

In embodiments of the invention, the first time that particular points (landmarks) are identified, the depth within the captured scene of those landmarks is not known. A point can be defined by a ray (representing an angular position with respect to the camera viewpoint) and an estimate of a distribution of probability of different depths. This estimate can in some embodiments be derived from other nearby points. The estimate can represent a Gaussian probability distribution, for example.

When an image is captured from another direction, the Gaussian distribution of depth estimate from the second stretch and can be combined with the Gaussian distribution of depth as estimated the complete first direction, to give a sharper (more precisely defined) depth estimate distribution.

Map Initialization

FIG. 13 is a schematic flowchart of a basic initialization technique (corresponding to the step 650 discussed above), comprising, at a step 652, capturing two images (or at least two images) of a scene from different camera positions and, at a step 654, deriving an initial map from the initially captured images. Here, it is assumed that the camera (by which the images are captured) is a monoscopic camera.

FIG. 14 schematically illustrates the capture of a pair of images at an initialization stage (corresponding to the step 652 discussed above).

Two images of the same scene are captured (for example by the camera 240 of the PED of FIG. 1) from different spatial positions. Specifically, in a first position, the camera is pointed at an object 800 within the scene and a first image of the object is captured (for example, by the user pressing an image capture button 804) which controls the camera (and which may be implemented as, for example, one of the buttons 330, 340 or by a soft button implemented on one of the front 310 and rear 320 touch surfaces).

The camera may be associated with the display or screen 200 which shows the captured first image. After the first image has been captured, the camera is moved to a second position so that a second image of the object 800 may be captured from a different perspective to that of the first image. Again, the second image is captured by the user pressing the capture button 804.

In this particular example, the camera is translated as indicated by an arrow 810 from the first position to the second position. The camera may also be rotated as it is translated, but in order for the initialization to work efficiently, however, the motion of the camera should primarily be translational rather than rotational.

The object 800 comprises several corner points capable of being detected in an image of the object by a corner detection algorithm. An example of a corner detection algorithm that could be used is the FAST (Features from Accelerated Segment Test) corner detection algorithm. Four of the points representing the corners of the flat top 12, are labelled by letters 800A . . . 800D. Each of the corner points 800A . . . 800D are detected in the first image and are tracked as the camera is translated to the second position to capture the second image.

Note that without sensors to augment the image capture data, at least five points are required for initializing using a Structure From Motion SFM approach, for example by using the so-called five point algorithm.

Note that determining point positions at initialization time is a harder problem than the one of determining new points positions after initialization. Creating 3D points at initialization time is a completely distinct process to the post-installation process. During normal system operation the system knows both the current and past camera poses and this information can be used to triangulate new points. At initialization time, the camera can be moved but the system does not know where the camera is. The five point algorithm solves for both the camera and the 3D points simultaneously. Also note that if angular velocity information is provided by a gyroscopic sensor, the same problem can be solved in a much simpler way by a 2 points algorithm. To summarize, for the general initialization case, the system can determine the 3D points' locations and the relative transform of the 2 cameras by acquiring 5 points or by using 2 points plus gyroscopic sensor information when this extra sensor is present. Note that these approaches require a large amount of motion required for distant objects.

Each of the corner points 800A . . . 800D in a captured image is defined by the position of a single pixel within that image. It should be noted, however, that each corner detected by the corner detection algorithm within an image actually comprises a patch of several pixels. This patch comprises an image feature which motivates corner detection, typically a point for which there are two dominant and different edge directions in a local neighborhood of that point. Each patch is typically a square of approximately 8×8 pixels in size, although other sizes and shapes could also be used. The single pixel position of each corner point in an image corresponds to, for example, the position of the bottom left hand corner pixel of the patch within that image.

The tracking of the points 800A . . . 800D is assisted in some embodiments because the camera 240 continues to capture intermediate images at a predetermined frame rate (such as 15, 30 or 60 Hz, for example) and detect those same corners 800A . . . 800D in each intermediate image as the camera is translated from the first position to the second position. The result of this tracking is that a correspondence can be established between the corner points 800A . . . 800D in the first and second images. That is, the corner point designated "800A" in the first image is also that designated "800A" in the second image, the corner point designated "800B" in the first image is also that designated "800B" in the second image, and so on. Detected corner points with the same designation in both the first and second images are therefore assumed to correspond to the same physical corner point on the real object 800.

In order for the tracking to be performed correctly, in some embodiments the user should translate the camera 240 from the first position to the second position in a smooth motion and at a speed such that the intermediate images that are captured at the predetermined frame rate do not become blurred. This allows the corner points 800A . . . 800D to be accurately detected for each intermediate image and hence their positions can be accurately tracked.

The first and second positions can be chosen so that the points 800A . . . 800D of the object 800 are at a similar distance from the camera when the camera is in the first position and when the camera is in the second position. As will be explained later, this allows an initial estimate of the 3-dimensional spatial position of each of the points 800A . . . 800D to be computed by further processing of the first and second captured images. To ensure that each of the points 800A . . . 800D are at a similar distance from the camera when the camera is in the first and second positions, the captured object 800 should be suitably far away from the camera so that slight movements of the camera nearer to or further from the object as the camera is moved from the first position to the second position are negligible.

In this example, only the four corner points 800A . . . 800D are discussed, for simplicity of the explanation. In reality, many more corner points will be tracked and mapped between the first and second captured images. Typically, around 1000 points will be tracked and mapped. These points could include more detectable corner points on the object 800 or detectable corner points on other objects (such as an object 820).

Figure 15B:
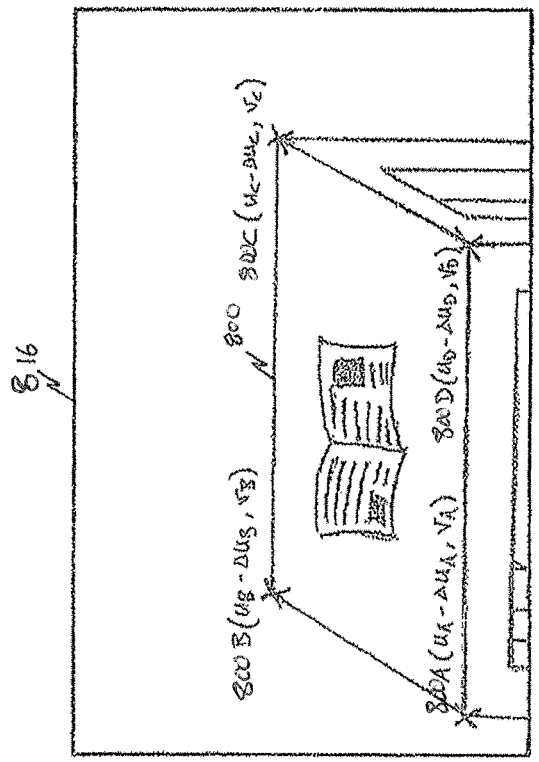
Figure 15A:
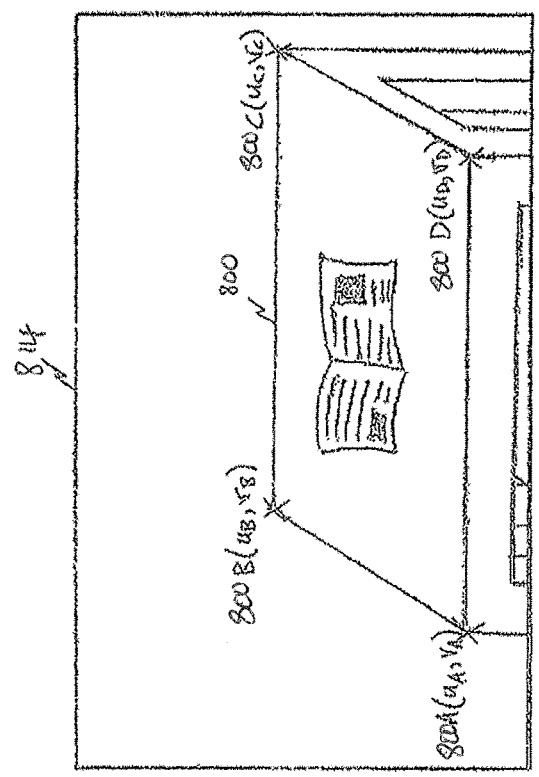

FIGS. 15a and 15b schematically illustrate a first image 814 and a second image 816 captured by the camera 240 in the initialization step 652.

In the first captured image 814, captured when the camera 240 is in the first position, the four corner points 800A-D have been detected and are marked at their detected locations within the image. The location of each of the corner points is given by a pixel location ($u_j$, $v_j$) within the image, where $u_j$ is the horizontal position of a general corner point j and $v_j$ is the vertical position of the general corner point j, with respect to a predetermined reference point within the image. The predetermined reference point could be, for example, the left-most corner of the image 814. In this particular example, j=A, B, C or D, representing the respective corner points 800A-D.

As the camera 240 is moved from the first position to the second position, the perspective of the images captured by the camera is changed. This means that the position of the object 800 within the second image 816, captured when the camera 240 is in the second position, is different to the position of the object 800 within the first image 814, captured when the camera 240 is in the first position. In turn, this means that the position of the corner points 800A-D in the second image 816 is different to the position of the corner points 800A-D in the first image 814.

For simplicity, the first and second positions of the camera in this example have been chosen so that the positions of the corner points 800A-D change between the first and second captured images in the horizontal direction only. Of course, during real use, it is unlikely that only a horizontal transformation will occur, since the real user is very unlikely to be able to perfectly translate the camera 240 in a single dimension. Nonetheless, the current example serves to adequately demonstrate the principal of the process initialization.

In the first captured image 814, the positions of the corner points 800A-D are given by ($u_A$, $v_A$), ($u_B$, $v_B$), ($u_C$, $v_C$) and ($u_D$, $v_D$), respectively. In the second captured image 816, the positions of the corner points A, B, C and D are given by ($u_A-\Delta u_A$, $v_A$), ($u_B-\Delta u_B$, $v_B$), ($u_C-\Delta u_C$, $v_C$) and ($u_D-\Delta u_D$, $v_D$). That is, the positions of the corner points 800A-D have moved to the left by amounts $\Delta u_A$, $\Delta u_B$, $\Delta u_C$ and $\Delta u_D$, respectively. In this particular example, where the corner points 800A-D have moved in a purely horizontal direction, it is the case that:

$$\Delta u_A = \Delta u_D \geq \Delta u_B = \Delta u_C$$

This is because, with respect to the first and second positions of the camera 240 within the scene, the points 800B and 800C of the object 8 are further away than the points 800A and 800D, and thus the positions of the points 800B and 800C appear to change by a smaller amount than the positions of the points 800A and 800D when the first and second captured images are compared.

By considering the amount by which each of the points 800A-D appear to move when the first and second captured images are compared, together with the distance by which the camera is translated as it is moved from the first position to the second position, it is possible to determine the distances of each of the points 800A-D from the position of the camera 240. Points which move by a smaller amount (800B and 800C in this case) are determined to be further away from the camera and points which move by a greater amount (800A and 800D in this case) are determined to be nearer to the camera. By knowing the distances of each of the points 800A-D from the position of the camera 240, it is possible to determine a map of the points 800A-D in a 3-dimensional (3D) coordinate system.

The position of the camera 240 may be the first or second position, since, as discussed above, the first and second camera positions are chosen so that the points 800A-D of the object 800 are at a similar respective distance from the camera when the camera is in the first position and when the camera is in the second position.

The 3D coordinate system may initially be chosen so that its origin is at the position of the camera 240, and thus the position of each of the points 800A-D is measured relative to the position of the camera. The 3D coordinate system may then be translated and/or rotated for convenience.

For example, as mentioned above, the object 800 is chosen such that it has a substantially flat component which can be used to define a horizontal base plane onto which AR graphics can be rendered. The horizontal base plane can be determined from the 3D mapped corner points of the object 800 using any suitable method. One such method is the known Random Sample Consensus (RANSAC) method. If the 3D coordinate system is chosen to be a 3D Cartesian coordinate system, it may aligned such that the horizontal base plane is defined by the plane z=0, for example.

The 3D spatial coordinate system may initially be presented in arbitrary units of length; however, these arbitrary units can be converted to metres, centimeters or any other suitable length unit by considering by how much objects within the camera's field of view at a given distance from the camera should appear to move given the camera translation distance. The camera translation distance may be computed using other parameters (such as motion detectors within the camera) or may be assumed to be a fixed predetermined value (10 cm, for example).

At the end of the initialization procedure, the two images 814, 816 are adopted as the first two keyframes of the set of keyframes. Some or all of the image features detected in common between those two initial keyframes are adopted as initial landmarks. Note that (as mentioned above) a landmark comprises a 3D position and an image patch. A keyframe comprises a camera posse plus a set of data or measurements relating to the positions of each of a subset of landmarks can be observed in that keyframe.

Tracking

FIGS. 16A-16E illustrate a tracking procedure on a newly captured image 818 of the example scene including the object 800.

FIG. 16A shows the image 818 as captured. It can be seen that the perspective view of the object 800 is different to that of the keyframes (for example, the first image 814 and second image 816, or any other keyframes subsequently added to the set), indicating that, when the image 818 was captured, the camera 240 was in a pose different to those applicable to the keyframes.

In FIG. 16B, corner detection is performed on the image 818, resulting in the detection of corner patches 920 (note that corner detection is used here just as an example of image feature detection). For simplicity, a small number of patches 920 are shown. In reality, as with the corner detection during the initialization procedure, a much larger number of patches may be detected. Again, the corner detection occurs by way of a corner detection algorithm such as the FAST corner detection algorithm. The corner patches should be of a size and shape which matches the original corner patches detected during the initialization procedure. Again, the corner patches are typically square portions of the image and are 8×8 pixels in size, although other sizes and shapes could also be used.

In FIG. 16C, an approximation of the pose of the camera is used to estimate the positions of the existing world map points in the newly captured image 818 (corresponding to the step 672 discussed above). The estimated positions of the existing world map points are projected onto the image.

In order to project existing world map points onto the image 818, it is first appropriate to transform the world map points from the chosen 3D coordinate system of the world map to a different 3D coordinate system associated with the camera 240 (for example, a coordinate system with the camera located at the origin). Such a transformation can be defined as:

$$p_{jC} = E_{CW} p_{jW} \quad (1)$$

The relationship of equation (1) shows that the position of a point j in a new coordinate system C associated with the camera, $p_{jC}$, can be obtained by pre-multiplying the position of the point j in the coordinate system W of the world map, $p_{jW}$, by a matrix $E_{CW}$ which represents the pose of the camera.

The position of the point j in a given coordinate system may be expressed as a four vector:

$$p_j = \begin{pmatrix} x_j \\ y_j \\ z_j \\ 1 \end{pmatrix}$$

The pose matrix $E_{CW}$ is obtained from the approximation of the pose of the camera (predicted camera pose) and is a 4×4 matrix which comprises a rotation and a translation component. $E_{CW}$ is a member of the Lie group SE(3), the set of 3D rigid-body transformations. $E_{CW}$ may be expressed relative to an initial pose matrix $\epsilon_{CW}$ representing an initial pose of the camera 240 (for example, the pose of the camera during the initialization procedure) via the relationship:

$$E_{CW} = M\epsilon_{CW} = \exp(a)\epsilon_{CW} \quad (2)$$

In equation (2), M represents the camera motion and is also a 4×4 matrix belonging to the Lie group SE(3). It is parameterized by the six-vector a using the exponential map. Three of the components of a represent a translation of the camera 240 with respect to the initial pose and the remaining three represent a change in orientation of the camera 240 with respect to the initial pose. From the initial pose matrix $\epsilon_{CW}$, the pose matrix corresponding to any given camera pose may thus be obtained by knowing how much the camera has been translated and rotated with respect to the initial pose corresponding to the initial pose matrix $\epsilon_{CW}$.

Note that some embodiments of the invention use the Lie group/algebra representation only when dealing with small camera displacements like during minimisation or motion numerical integration; for general camera poses the relative pose is simply:

$$\text{inverse}(poseA) * poseB$$

Given the position of the point j in the new coordinate system C associated with the camera, $p_{jC}$, given by equation (1), the point j may be projected onto the newly captured image 818 using a camera projection function. The camera projection function transforms the 3-dimensional position of the point j in the new coordinate system C into a 2-dimensional position within the image 818, as shown by equation (3):

$$\begin{pmatrix} u_j \\ v_j \end{pmatrix} = CamProj(p_{jC}) = CamProj(E_{CW} p_{jW}) \quad (3)$$

In equation (3), the camera projection function is denoted 'CamProj' and the 2-dimensional position of the point j is given in column vector form. Any suitable camera projection function may be used. For example, a pin-hole camera projection function which supports lenses exhibiting barrel radial distortion can be used, such as that given by equation (4):

$$CamProj \begin{pmatrix} x \\ y \\ z \\ 1 \end{pmatrix} = \begin{pmatrix} u_0 \\ v_0 \end{pmatrix} + \begin{pmatrix} f_u & 0 \\ 0 & f_v \end{pmatrix} \frac{r}{r'} \begin{pmatrix} x/z \\ y/z \end{pmatrix} \quad (4)$$

Here, the camera parameters for focal length ($f_u$, $f_v$), principle point ($u_0$, $v_0$) and distortion $\omega$ are assumed to be known. Further, the parameters r and r' are defined as follows:

$$r = \sqrt{\frac{x^2 + y^2}{z^2}}$$

$$r' = \frac{1}{\omega} \arctan\left(2r \tan\frac{\omega}{2}\right)$$

Other embodiments can use a different polynomial distortion model, without any tangential distortion vector dx.

It is seen in FIG. 16C that estimated positions 800A-D' of the points 800A-D have been projected onto the image 818. The projected positions are marked by the "X" signs in FIG. 16C. The approximation of the camera pose does not have sufficient accuracy to allow the points 800A-D to be projected onto exactly the correct positions of the image, and therefore the projected positions 800A-D' are slightly displaced from the actual positions of the points 800A-D in the image.

The estimated position 800A-D' of each of the points is, however, in the vicinity of a respective patch 920 detected by the corner detection algorithm. Specifically, patches have been detected for each of the four corners of the flat top 812 of the object 800 which correspond to the actual positions of the points 800A-D, and each of the points has been projected in the vicinity of the patch corresponding to its actual position.

A subset of the points is then selected for a patch search. The subset of points may be selected randomly, or may be selected by choosing points for which the nearest patch (or patches) 920 comprises the most prominent features.

FIG. 16D illustrates a scenario in which the points A, B and D are selected for a patch search. For a selected point, the patch search occurs by first establishing a fixed boundary 922 (corresponding to the search area 694 discussed earlier) encompassing the projection of the selected point and so as to define a portion 924 of the image 818 to be searched. Note that the search area is centred around the predicted landmark location. The original patch detected during the initialization procedure for the selected point (the pixels for which are referenced by the selected point in the world map) is then used to define a search template (to be referred to as a 'predicted landmark appearance') for pixel matching within the boundary 922.

The search template is obtained by "warping" the original patch (the patch associated with the landmark) and is a pixel block of a given size and shape (for example, an 8×8 pixel square). The warping of the original patch is explained later. Pixel matching of the search template then occurs with blocks of pixels within the image portion 924 which are the same size and shape as that of the search template. Any suitable pixel matching method may be used. The aim of the pixel matching of the search template is to find, in a newly captured image 818, the same physical feature that was detected by the corner detection algorithm during the procedure to initialize that landmark and for which the original patch and corresponding world map point were created. As will be explained, this is to allow the 2-dimensional position of the selected point in the new image 818 to be determined more accurately.

Note that the stored patch associated with a landmark may be bigger than the 8×8 patch used for matching, this because warping may shrink the effective size of the original patch, for example when seeing the original patch from a shallower angle.

Pixel matching of the search template with and/or near to detected patches 920 within the image portion 924 occurs first. For simplicity, FIG. 16D illustrates only a single patch 920 present within each of the boundaries 922. It is possible, however, for several patches to be present within a given boundary 922. Because of the pixel matching procedure, however, patches 920 for which there is no successful pixel match with the search template (which may be all patches, if the original corner point within the scene is hidden from view) are eliminated from consideration.

If a match occurs within the portion 924, then the single pixel position (u, v) of the selected point in the newly captured image 818 (point 800A, 800B or 800D in FIG. 16D) is updated in accordance with this match. Specifically, the single pixel position of the selected point will be updated to a position on the pixel block to which the search template is matched which corresponds with the position of the selected point on the original patch. For example, if the search template is an 8×8 pixel block and the single pixel position of the corner point on the original patch happens to be the bottom left hand corner pixel position of this 8×8 block, then the updated single pixel position (u, v) of the selected point will be determined as the position of the bottom left hand corner pixel of the matched pixel block within the newly captured image 18.

When the positions (u, v) of a sufficient number of selected pixels have been updated, the new positions can be extrapolated to the world map points that were not selected so as to improve the accuracy of the positions of all the world map points present in the newly captured image 18. This is demonstrated in FIG. 16E, in which the updated positions of points 800A, 800B and 800D have been used to estimate a more accurate position of point 800C. The 2-dimensional position of each of the points 800A-D in the newly captured 18 has thus been more accurately determined. As will be explained later on, this in turn allows the position of the camera within the scene (as expressed in terms of the 3D coordinate system of the world map) to be determined more accurately.

In embodiments of the invention, the tracking stage may involve the following:

(i) A camera pose is predicted as discussed earlier.

(ii) The predicted camera pose is employed to generate predicted 2D landmark positions in the current view.

(iii) Predicted landmarks are sorted accordingly to a score. The score is computed in order to meet a set of desirability criteria (for example, likelihood of finding a good match with minimum or low processing effort).

(iv) For each sorted predicted landmark, starting from l=0 (lowest pyramid level—see below) in the current view, a predicted landmark appearance (warped patch) in the current view is generated by using the stored patches (up to 4), the camera pose applicable to the image from which the landmark was created and the current predicted camera pose. For the current pyramid level and considered landmark, a source patch is selected so that the pixel size is closest to the current image pixel size (the current image is the current pyramid level of the last capture image). An exhaustive zero mean SSD (sum of squared differences) search of a landmark predicted appearance is performed within the current image. The search is restricted within a radius or search area centred on the landmark's predicted location. Landmarks may be considered in descending order of desirability (higher scoring first).

(v) SSD match scores below a threshold (where a low SSD score is indicative of a good match) are considered to be successful landmarks detections. These measurements may be refined by a sub pixel accuracy image alignment algorithm.

(vi) This obtains a set of landmark "measurements" in respect of the current image and their associated predictions. This allows the system to solve for the camera pose that minimises the reprojection error (for example, the distance between the landmarks predictions and their associated measurements). A robust nonlinear least squares solver is fed with an initial estimated camera pose. This is a differently predicted camera pose computed from the last estimate camera and the integrated gyro angular velocity information. Note that this process is not changing the landmarks' locations in the map, it is just changing the camera pose in such a way that the landmark predictions (in respect of the current image) get closer to their measurements in that image.

Pyramid Levels

So far, the initialization and tracking procedures have been explained by considering each of the captured images at a single resolution. In order to carry out corner detection of features of different sizes and prominence, however, it can be beneficial to consider each captured image at a number of different resolutions, or pyramid levels. For example, if the camera 240 captures images at 640×480 pixels, then corner detection can be undertaken at each of 640×480 (pyramid level l=0), 320×240 (pyramid level l=1), 160×120 (pyramid level l=2) and 80×60 (pyramid level l=3) resolutions. In the highest pyramid level (which has the lowest resolution), the largest and most prominent features will be detected by corner detection. Smaller and less prominent features will then be detected in successively lower pyramid levels.

The different pyramid levels of a newly captured image 818 can be used to track the positions of world map points in the image with a high level of accuracy whilst keeping computational expense low (note that this help a lot with robustness too, as it can reduce the number of outliers and allows for tracking with motion blur). This is achieved by performing the tracking procedure in a two-stage process. During the first stage, corner detection (in some embodiments at least; omitted at this stage in others), point projection and pixel matching occur at the highest pyramid levels of the image and for a relatively small number of points (50, for example) over a large portion 924 for each point. This provides an initial correction of the positions of the points. Then, during the second stage, corner detection, point projection (using the initially corrected point positions of the first stage) and pixel matching occurs again, but for the lowest pyramid levels of the image and for a much larger number of points (1000, for example) over a small portion 924 for each point. This allows a much more precise correction of the positions of the points.

Because the initially corrected point positions of the first stage are used for projecting the points onto the image during the second stage, the projected positions of the points will be nearer to the actual positions of the points then they would otherwise be during the second stage. The image portion 924 for each of the projected points in the second stage can thus be made smaller than it would otherwise need to be. Because the image portions 924 during the second stage are small, a much smaller area of the image needs to be searched during the pixel matching, reducing the amount of processing required for the pixel matching. This reduction in processing more than offsets the extra processing required for completing two rounds of tracking rather than one.

Warping

As has already been mentioned, the search template for a particular world map point is generated by warping the original patch associated with that world map point. This warping is appropriate because the image features of the original patch will appear to become warped or distorted in images which are captured from a different perspective and/or with a different part of the lens of the camera 240 (due to barrel lens distortion, for example). The original patch may be warped by using an affine warping matrix A of the form:

$$A = \begin{pmatrix} \partial u_C/\partial u_s & \partial u_C/\partial v_s \\ \partial v_C/\partial u_s & \partial v_C/\partial v_s \end{pmatrix} \quad (5)$$

where ($u_S$, $v_S$) are horizontal and vertical pixel displacements at the pyramid level at which the original patch was detected and ($u_C$, $v_C$) are horizontal and vertical pixel displacements at the lowest pyramid level (that is, pyramid level l=0) of the newly captured image. (Note that in some embodiments a projective warping may be used which is not affine; instead a two view transfer of the patch corners may be performed so as to compute the area directly)

The horizontal and vertical pixel displacements at the pyramid level of the original patch ($u_S$, $v_S$) may be computed by, for example, considering the difference between the 2-dimensional position of the world map point associated with the original patch detected for the first (or second) captured image during the initialization procedure and the projected 2-dimensional position of that same world map point in the newly captured image given by equation (3).

The corresponding horizontal and vertical displacements at the lowest pyramid level of the newly captured image ($u_C$, $v_C$) can then be computed by considering the relationship between the pyramid level of the original patch and the lowest pyramid level of the newly captured image. For example, if the pyramid level of the original patch has a 320×240 pixel resolution and the lowest pyramid level of the newly captured image is the native 640×480 pixel resolution (so that the resolution of the original patch is half that of the newly captured image in each of the horizontal and vertical directions), then a unit pixel displacement at the pyramid level of the original patch in a given horizontal or vertical direction corresponds to a two pixel displacement at the lowest pyramid level of the newly captured image.

By using the finite measures of the horizontal and vertical displacements, ($u_S$, $v_S$) and ($u_C$, $v_C$), the derivatives which form the elements of matrix A may be approximated. The original patch may then be warped by pre-multiplying the column vector pixel position $(u\ v)^T$ of each pixel of the original patch by the matrix $A/2^l$, where l is a pyramid level of the newly captured image chosen for pixel matching, and by using bilinear interpolation (although in some embodiments the warping is projective rather than affine). Once this predicted appearance of the original patch has been obtained, it may be used for pixel matching in the portion 924 of the newly captured image 818 associated with the world map point.

The pyramid level, l, for pixel matching of the newly captured image 818 may be chosen by considering the determinant of the affine warping matrix A. The determinant of A, det (A), gives the area (in pixels) that a single pixel at the pyramid level of the original patch will occupy at the full resolution (that is, the lowest pyramid level l=0) of the newly captured image. If the number of pixels along each direction is halved for each successive pyramid level of the newly captured image (so that the total number of pixels is divided by 4 for each successive pyramid level), then the area (in pixels) that a single pixel at the pyramid level of the original patch will occupy at the pyramid level l is given by det $(A)/4^l$. The pyramid level for pixel matching of the newly captured image should be chosen so that det $(A)/4^l$ is closest to unity.

Scale Selection

Embodiments of the invention use a slightly different algorithm than PTAM for scale selection. Note that in PTAM each landmark or point has only one patch (single scale) associated with it. Given a landmark's patch, they select the pyramid level in the current image with a scale closest to the one of the warped patch. In embodiments of the present technique up to 4 patches can be stored for a single landmark so the system may try to match a multi-scale landmark against a multi-scale image (the current image under consideration). For a landmark the system tries to find its most accurate measurement, and so starts from the lowest possible level (2 in the coarse tracking stage, 0 in the fine stage) in the current view, selects the best landmark's source patch in terms of scale, warps and matches it. If matching fails, the system moves up one level in the current view and repeats the process again.

Pose Derivation

Once the precise 2-dimensional positions of the world map points (landmarks measurements) have been obtained in the newly captured image 818 (as shown in FIG. 16E), it is possible to obtain an accurate measure for the pose of the camera 240 for which that image was captured. It is recalled from equation (3) that the projected position of the general point j in the newly captured image 818 is denoted:

$$\begin{pmatrix} u_j \\ v_j \end{pmatrix}$$

Let us now denote the updated position of the point j, generated by the above tracking procedure, as:

$$\begin{pmatrix} \hat{u}_j \\ \hat{v}_j \end{pmatrix}$$

Typically, the updated positions of the points detected at the lowest pyramid level of the newly captured image 818 are used for determining the pose of the camera.

The camera pose may be updated iteratively from the set S of successfully updated positions of the points A-D by minimising a robust objective function of the errors of the original projected point positions (see FIG. 16C). The robust objective function has the form:

$$a' = \underset{a}{\operatorname{argmin}} \sum_{j \in S} Obj\left(\frac{|e_j|}{\sigma_j}, \sigma_T\right) \quad (6)$$

The objective function can (in some embodiments) include an extra term, an orientation measurement derived from the gyro.

where $e_j$ is the error of the original projected position of the point j, given by:

$$e_j = \begin{pmatrix} \hat{u}_j \\ \hat{v}_j \end{pmatrix} - \begin{pmatrix} u_j \\ v_j \end{pmatrix} = \begin{pmatrix} \hat{u}_j \\ \hat{v}_j \end{pmatrix} - CamProj(\exp(a)\varepsilon_{CW} p_{jW}) \quad (7)$$

Recall that $p_{jW}$ is the position of the point j in the 3D coordinate system of the world map, $\varepsilon_{CW}$ is the initial pose matrix and a is a six-vector describing the position and orientation of the camera 240 with respect to the initial camera pose associated with the initial pose matrix.

The function Obj (–, $\sigma_T$) is the Tukey bi-weight (or, in other embodiments, a Huber weighting function) objective function and $\sigma_T$ is a robust (median-based) estimate of the standard deviation of the projection errors $e_j$ derived using the projection error residuals. The parameter a represents the background noise (the pyramid level pixel size, 1, 2, 4, 8 etc. The standard deviation of the measurements is determined by the pyramid level where they occurred) present when determining the updated position of the point j via pixel matching. $\sigma_T$ is the common variance of the residuals, used to standardise the residuals internally.

The final value of a' is obtained after a predetermined number of iterations (10, for example) and gives the new pose of the camera 240 with respect to the initial pose. (Note that the camera pose estimator needs an initial pose estimate in order to converge).

The tracking procedure is carried out for every image captured by the camera at the predetermined frame rate. This allows the pose of the camera, with respect to the 3D positions of the world map points, to be tracked in real time.

Adding Points to the Map

An example of a procedure will now be explained with reference to FIGS. 17A to 17C to allow new corner or feature points to be added to the map as new images of the scene are captured by the camera 240, thus building the map. Note that this is different to a full mapping procedure of the type used in PTAM (which does not necessarily occur for every image captured by the camera) which attempts to find accurate positions of all existing corner points in an image (rather than just a subset, as in the tracking procedure) and to add new corner points to the map, Such a full mapping procedure is far more computationally intensive for each image. Differently from PTAM, embodiments of the invention can run corner detection every image in order to create and track points as soon as they are required, and can use key-frames in order to globally optimise or improve the map.

As an example, FIG. 17A shows the same newly captured image 818 of the object 800 as that shown in FIGS. 16A-16E, together with the detected corner patches 920. The corner patches 920 are the same as those detected during the tracking procedure, and include the corner patches associated with each of the corner points 800A-D (these patches have been labelled accordingly in FIG. 17A).

The first stage of the procedure involves patch searching of the known corner points in the image which were not patch searched during the tracking procedure. In embodiments of the invention new landmarks are created starting from corners which are sufficiently distant from predicted landmarks that led to good matching behaviour in the most recent frames. In this example, it is recalled from the discussion of FIG. 16D that only points 800A, 800B and 800D were searched during the tracking procedure, so the first stage of the mapping procedure involves patch searching around the point 800C. This patch search occurs in exactly the same way as has already been described, namely by attempting to pixel match a search template derived from the original patch associated with the point C in an image portion 924 defined by the boundary 922 and which comprises an estimated position 800C' of the point 800C. The estimated position of the point 800C is approximated from the updated positions of the points 800A, 800B and 800D, as has already been described.

The updated positions of the points not originally considered during the tracking procedure can be used, in accordance with the methods already described, to obtain an accurate measure of the pose of the camera when the image 818 was captured. New points can be created on the top of old ones if a point is not being matched very reliably (a possible reason for an unreliable match is that a landmark's patch is being warped from a very different point of view compared to the point of view when that patch was captured).

Note that as corner detection can be a slow (processor intensive) process, embodiments of the invention can use a tile based approach in order to limit the corner detection CPU time.

An example of such an arrangement is shown schematically in FIG. 18, in which an image 950 is notionally divided into "tiles" 960 at one or more pyramid levels. To add new points to the map, a probability distribution is created for the current image tiles based on the predicted landmarks positions for that image. The probability distribution is indicative of how many of the predicted landmark positions fall into each tile in the current image, as a proportion of the total number of predicted landmark positions applicable to this image. Based on this probability distribution a most "empty" subset of N tiles is selected the corner detector algorithm is run in respect of those N tiles. A "most empty" tile is one which has a lowest value of the probability distribution. N is set as a lower number than the total number of tiles (the total number being 9 in the example of FIG. 18) according to how much time or processor resource can be allocated for corner detection in respect of the current image.

The second stage of the procedure involves finding patches 920 detected during the corner detection which are not yet associated with a corner point in the map. New corner points associated with these patches may then be added to the map.

This is achieved by removing from consideration patches sufficiently close to existing corner points. Sufficiently close patches could be those within the patch search boundary 922 of an existing corner point, for example. In FIG. 17B, it is seen that the patches associated with the known corner points 800A-D have been removed from consideration, leaving only a single patch 926 not associated with a known corner point. The single patch 926 becomes a candidate for defining a new corner point 800E to be added to the map, as shown in FIG. 17C.

In order for the new corner point 800E to be added to the map, it is necessary to find that same point in another image captured by the camera 240 from a different pose to that used in capturing the current image 818. This is because viewing the same point from at least two different perspectives is necessary in order to determine the depth of that corner point. This may be achieved by choosing a previous image captured by the camera in a pose close to that of the current pose and attempting to pixel match the single patch 926 in the vicinity of the epipolar line of that previous image. The epipolar line of the previous image is defined by the straight line connecting the point of projection of the current image 818 with the single patch 926 as viewed from the point of projection of the previous image.

If a successful pixel match occurs, the 3D position of the new corner point 800E can be triangulated from the two images and associated camera poses using any suitable stereoscopic imaging or triangulation technique. The new corner point 800E is then added to the map. If there is as yet no previous image for which the patch 926 can be pixel matched, the patch 926 is discarded as a candidate corner point. It may however be added to the map at a later stage if it is identified as a candidate in subsequently captured images.

Embodiments of the present invention can combine the benefits of a filter approach and a parallel tracking and mapping approach so as to give an initial approximation and allow a fast response to a changing camera position. This is similar to the arrangements described above, with the following notable features. Firstly, points are inserted into the map as rough points. One processor thread then tracks the camera position, initially on the basis of the rough points (embodiments of the invention track both rough and non rough points, depending on what is currently visible), and the other processor thread is useful map establishment. Secondly, points can be added at any time. That is to say, in some of the arrangements described above, new points can only be added at so-called key-frames (key-frames are used for global optimisation processes). If there is a significant amount of camera movement or other scene changes between key-frames, it is possible that the system may not have sufficient points to provide accurate camera tracking between key-frames. By allowing the addition of points to any frame, not just to key-frames, this problem can be alleviated.

Note also that key-frames in PTAM can be added only after the system has at least partially finished its local/global optimisation process in the mapping thread.

In embodiments of the invention, the first time that particular points (landmarks) are identified, the depth within the captured scene of those landmarks is not known. A point can be defined by a ray (representing an angular position with respect to the camera viewpoint) and an estimate of a distribution of probability of different depths. This estimate can in some embodiments be derived from other nearby points. The estimate can represent a Gaussian probability distribution, for example.

When an image is captured from another direction, the Gaussian distribution of depth estimate from the second stretch and can be combined with the Gaussian distribution of depth as estimated the complete first direction, to give a sharper (more precisely defined) depth estimate distribution.

Embodiments of the invention have changed the mapping pipeline and removed inverse depth landmarks. Instead, candidate landmarks are created by extracting a patch around a corner and searching it (by a zero mean SSD search) again in the successive frames without doing any patch warping. The search is performed within a search radius centred on the last found match. Given the camera pose of when the corner was extracted and the current camera pose, we delete a candidate landmarks as soon as matching fails or if the last match doesn't lie within a distance threshold from the epipolar line. As soon a predefined parallax threshold is reached, the two camera poses (initial and current) and respective two matches are used to triangulate the candidate landmark position. Further the positions are refined using nonlinear minimisation and consider the two cameras as fixed in this process. All this happens in the tracking thread. The estimated position and its covariance are used to create a new 3D landmark. The landmark position is refined every frame by an Unscented Kalman filter. These new landmarks are also employed for tracking if the tracking module cannot find enough bundled landmarks. Further the measurement weights returned by the M-Estimator used for camera pose estimation are used to classify '3D landmarks' as either inliers or outliers. Outlying 3D landmarks are removed from the system.

FIG. 19 is a schematic flowchart illustrating an example of a point addition procedure.

The technique of FIG. 19 comprises the following steps, in respect of the generation of a three-dimensional map of a region from successive images of that region captured from different camera poses, the map comprising a set of landmark points each defined by a three dimensional spatial position and image information associated with that three dimensional position:

At a step 1000, the technique comprises capturing successive images of the region and detecting feature points within the captured images. A subset of the captured images may be designated (as discussed earlier) as a set of key-frames each having camera pose data indicative of a camera pose and respective sets of measurement data representing image positions of landmark points detected as feature points in that image.

At a step 1010, for a feature point, not corresponding to a bundle-adjusted landmark point, detected at an intervening image (an image between keyframes) which is not a keyframe and present in another intervening image which is not a keyframe, a non-bundle-adjusted point is generated corresponding to that feature point.

At a step 1020, a camera pose is derived in respect of an image using the non-bundle-adjusted points and the bundle adjusted landmark points. This is a significant change from previous systems as it involves allowing non-bundle-adjusted points to be added at (potentially) any image, not just in respect of a keyframe or in respect of a bundle adjustment process, and for those non-bundle-adjusted points to be used, in addition to the bundle-adjusted points, in the derivation of a camera pose for a current image.

At a step 1030, if bundle adjustment is to take place then control passes to a step 1040 at which, in respect of the keyframes, bundle-adjustment is performed to generate bundle-adjusted landmark points by iteratively refining the three dimensional spatial positions of the landmarks and the camera pose data associated with at least a subset of the keyframes by: (i) deriving a difference between the measurement data for landmark points in the keyframes and corresponding image positions obtained from the camera pose data and the three dimensional spatial position of that landmark point; and (ii) adjusting one or both of the camera pose data for one or more keyframes and the three dimensional spatial position of one or more landmark points so as to reduce the detected difference. As part of the bundle adjustment process, one or more unbundled points may be promoted to become bundle adjusted landmark points.

Embodiments of the technique therefore comprise, at a next keyframe, performing bundle adjustment with respect to one or more of the non-bundle-adjusted points so as to convert one or more of the non-bundle-adjusted points into bundle-adjusted landmark points.

As discussed earlier, in order to predict a position of a non-bundle-adjusted point, embodiments involve applying a position tracking filter to predict an image position corresponding to a non-bundle-adjusted point from image to image. In some embodiments, the decision as to which points to adopt as non-bundle-adjusted points can be varied according to how close a point is to its predicted position, so that the method comprises comparing the predicted image position of a non-bundle-adjusted point with a detected image position of an image feature point corresponding to that non-bundle-adjusted point; and detecting a statistical quality of the non-bundle-adjusted point from the comparison. To make use of such data, some embodiments adopt, as non-bundle-adjusted points, those intervening image feature points having at least a threshold statistical quality. In some embodiments, the step of generating a non-bundle-adjusted point comprises selecting a subset of one or more feature points of the intervening image to become non-bundle-adjusted points. This can be achieved by detecting an image distance between a feature point and the image position of a nearest bundle-adjusted point in the intervening image; and selecting a feature point as a non-bundle-adjusted point which has at least a threshold image distance from a nearest a bundle-adjusted point in the intervening image. Alternatively or in addition, the selecting can be achieved by the tiles technique discussed above, by detecting the number of landmark points relating to each of a plurality of different image regions of that intervening image; and selecting a new feature point to be added as a non-bundle-adjusted point according to a weighting applicable to the image region containing that feature point, such that the weighting is lower for an image region having a higher number of landmark points.

As discussed, in order for a point to be added to the map from an intervening image, in embodiments of the invention it is necessary to be able to detect an initial approximation of the three dimensional position of that feature point by triangulation between two images having different camera poses.

In embodiments of the invention the techniques of FIG. 19 can be implemented by (for example) the PED of FIG. 1, acting as an example of image processing apparatus operable to generate a three-dimensional map of a region from successive images of that region captured from different camera poses, the map comprising a set of landmark points each defined by a three dimensional spatial position and image information associated with that three dimensional position, a subset of the captured images being designated as a set of keyframes each having camera pose data indicative of a camera pose and respective sets of measurement data representing image positions of landmark points detected as feature points in that image, the apparatus comprising: a bundle adjuster operable in respect of the keyframes to perform bundle-adjustment to generate bundle-adjusted landmark points by iteratively refining the three dimensional spatial positions of the landmarks and the camera pose data associated with at least a subset of the keyframes by: (i) deriving a difference between the measurement data for landmark points in the keyframes and corresponding image positions obtained from the camera pose data and the three dimensional spatial position of that landmark point; and (ii) adjusting one or both of the camera pose data for one or more keyframes and the three dimensional spatial position of one or more landmark points so as to reduce the detected difference; a point generator operable, in respect of a feature point, not corresponding to a bundle-adjusted landmark point, detected at an intervening image which is not a keyframe and present in another intervening image which is not a keyframe, to generate a non-bundle-adjusted point corresponding to that feature point; and a camera pose detector operable to derive a camera pose in respect of an image using the non-bundle-adjusted points and the bundle adjusted landmark points.

Deletion of Measurements or Keyframes

The processes described above relate to the addition of keyframes. As mentioned, each keyframe comprises data defining a camera pose and a set of measurements indicating the image position, within that keyframe, of respective landmarks.

It may be appropriate to remove measurement data from a keyframe or even to remove a whole keyframe. There could be various reasons why this might be appropriate. A significant reason is to reduce the processing required for bundle adjustment. Bundle adjustment is a processor-intensive task, which can be a particular problem in the context of handheld portable devices such as the PED described above or a mobile telephone. The processing operations required to carry out bundle adjustment increase dramatically as the number of measurements and keyframes increases. Actively removing measurement data can significantly reduce the processing overhead required for bundle adjustment. Another feature of the use of these techniques in respect of handheld devices is that many such devices have built-in cameras with a relatively narrow field of view. Some devices such as mobile telephones are also normally used in a portrait mode which reduces the horizontal field of view of the camera even further. So, this can result in the addition of many keyframes when a new (previously unmapped) area is being explored. But not all of these keyframes may be required for ongoing use of the map.

However, it is not appropriate simply to delete measurements or keyframes arbitrarily. This could result in the map becoming "broken" which in this context would mean that the bundle adjustment process may potentially fail. The techniques to be described below relate to methods for testing and then removing candidate measurements or keyframes without breaking the map.

FIG. 20 schematically illustrates an association between keyframes and landmark points. Here, the aim is to illustrate connections or associations between keyframes and landmarks; the spatial layout of FIG. 20 has no technical significance in any other respect.

In particular, FIG. 20 shows a set of keyframes KF1 . . . KF5 and a set of landmark points 1100. If a landmark point 1100 has corresponding measurement data associated with a keyframe then this association is indicated in FIG. 20 by a line drawn between the keyframe and that landmark point. Because the various keyframes are captured with different spatial viewpoints (see the step 686 discussed above) the different keyframes will have a view of different ones of the landmark points. So, different keyframes will have measurement data for different ones of the landmark points.

Returning to the earlier discussion of the way in which the bundle adjustment process is carried out, the process aims to optimise the camera poses of the keyframes and the three-dimensional spatial positions of the landmark points by detecting and reducing the re-projection error, which is dependent upon differences between the measurement data associated with the keyframe and a predicted position of a landmark point in that keyframe based on the current camera pose and three-dimensional position of the landmark point. Taken across a set of keyframes (a subset of n keyframes in the case of local bundle adjustment, or a larger group in the case of global bundle adjustment), embodiments of the invention recognise that in order for this bundle adjustment process to converge on an internally consistent solution there are constraints on the relationships between the keyframes, their measurement data and the landmark points.

With reference to FIG. 20, a keyframe KF1 has connections to (that is to say, has measurement data corresponding to) landmark points 1101, 1102, 1105 and 1106. The keyframe KF2 has connections to the landmark points 1102, 1104, 1105, 1106, 1108 and 1109. A connection between keyframes is defined as a situation in which two keyframes have measurement data for at least m landmark points in common. Here, the value of m should be at least three in order to constrain the keyframes with respect one another so that a camera pose can be recovered by comparison of the two keyframes. In practice, a value of m which is greater than three may be found to be appropriate, so as to allow for errors, poor quality data (outlying points) and the like. However, the minimum is m=3.

So, if KF1 and KF2 have measurement data for at least three common landmark points, the two keyframes are considered to be connected.

Considering now the situation across multiple keyframes, FIG. 21 schematically illustrates a connections graph showing a set of connections across a group of example keyframes KFn . . . KFn+4. Here, each line between the box corresponding to a keyframe and another box for another keyframe indicates a connection, as defined above, between the two keyframes.

A condition can now be defined as follows. The map is considered to be "not broken" if each keyframe is directly or indirectly connected to each other keyframe (in the whole set of keyframes or in a set of keyframes under consideration, for example during local bundle adjustment) by a series or sequence of one or more such connections.

To give an example of this type of connection, the keyframe KFn is connected to the keyframe KFn+3 in FIG. 21 by a single connection. That is to say, these two key frames have measurement data for at least three landmark points in common. The keyframe KFn is also connected to the keyframe KFn+2 in FIG. 21. This is the case even though the keyframe KFn and the keyframe KFn+2 do not in fact have measurement data for three landmark points in common. However, they are indirectly connected because the keyframe KFn+3 is itself connected to the keyframe KFn+2, so that there is a sequence of connections from the keyframe KFn to the keyframe KFn+3 and from there to the keyframe KFn+2.

FIG. 22 is a schematic flowchart illustrating a process for detecting whether a measurement or a keyframe can be removed.

This process can be carried out, for example, is part of bundle adjustment or at another time. The aim is to establish whether a measurement or a whole keyframe can be removed from the set of keyframes under consideration. As mentioned above, a reason for removing the measurement or a keyframe is to simplify the bundle adjustment process, particularly in the context of a low powered processor.

In terms of selecting a candidate measurement or a candidate keyframe, various criteria can be used. For example, a measurement could be selected as a candidate measurement for removal if, in the keyframe under consideration, it represents an image position which is within a threshold image distance of the image position represented by another measurement. Removal of a keyframe corresponds to removal of the last remaining measurement such that the keyframe will no longer have at least three measurements associated with it, but a selection at a keyframe level to choose a candidate keyframe to remove could be based upon the camera pose data associated with the keyframe, such that if two keyframes have camera poses which are within a threshold translation and rotation of one another, one of the keyframes is selected as a candidate for removal.

But before a measurement or a keyframe is removed, it is tested as a candidate keyframe or measurement for removal (at a step 1120) in order to detect whether the map would be broken by that removal. The test involves detecting whether the candidate measurement or key frame may be removed by detecting whether each keyframe, in the set of keyframes without the candidate measurement or keyframe, is still directly or indirectly connected to all other keyframes in the set of keyframes by a sequence of one or more keyframe to keyframe connections.

If this test is passed, which is to say that the keyframes remain connected to one another despite the removal, then the candidate measurement or keyframe is removed at a step 1130. If not, the candidate is not removed.

FIG. 23 schematically illustrates a connections graph with a connection removed. The set of keyframes is the same as that shown in FIG. 21, but because of the potential removal of a measurement, the test at the step 1120 has resulted in a change to the connection graph. In particular, under the test of the step 1120 a direct connection between the keyframes KFn+2 and KFn+3 is no longer present. However, the test at the step 1120 is still passed because each keyframe is still connected to each other keyframe by a series of one or more connections. In particular, the keyframe KFn+2 is still connected to all other keyframes via the keyframe KFn+1. So, control can pass to the step 1130 at which the candidate connection is removed.

A convenient technique for carrying out the step 1120 is to use so-called connected components analysis. This is an analytical technique which groups together elements (such as keyframes) of a graph such as that shown in FIG. 21 so that the number of "components" indicates the extent to which the elements are connected together. If there is just one component, the elements are all directly or indirectly connected by a sequence of one or more connections (where a connection is defined as having at least m measurements relating to common landmark points, where m is at least 3). If the analysis generates more than one component, this test (corresponding to the step 1120) is failed. Accordingly, in embodiments of the invention, the step 1120 comprises generating a connection graph between the keyframes of the set, excluding the candidate measurement data, by connected components analysis; and the step 1130 comprises removing the candidate measurement data if the connection graph comprises only one component.

As discussed above, the tests may be applied to the potential removal of a whole keyframe, such that the candidate measurement data comprises all measurement data associated with a keyframe (or at least sufficient that the keyframe no longer meets the requirements of a keyframe), in which case the step 1120 comprises detecting whether each keyframe, in the set of keyframes, excluding the keyframe corresponding to the candidate measurement data, is still directly or indirectly connected to all of the other keyframes in the set of keyframes, excluding the keyframe corresponding to the candidate measurement data, by a sequence of one or more connections; and the removing step 1130 comprises removing that keyframe from the set of keyframes.

In embodiments of the invention the techniques of FIGS. 20-23 can be implemented by (for example) the PED of FIG. 1, acting as an example of image processing apparatus operable to generate a three-dimensional map of a region from successive captured images of that region captured from different camera positions, the map comprising a set of landmark points each defined by a three dimensional spatial position and image information associated with that three dimensional position, a subset of the captured images being designated as a set of keyframes each having respective sets of measurement data representing image positions of landmark points detected as feature points in that image, each keyframe being connected to at least one other keyframe in the set by a connection comprising at least a threshold number of landmark points, having corresponding measurement data for that keyframe, in common with the same landmark points having corresponding measurement data for that other keyframe in the set, and the set of keyframes being such that each keyframe in the set is directly or indirectly connected to all of the other keyframes in the set by a sequence of one or more such connections, the apparatus comprising: a detector operable to detect whether candidate measurement data associated with a keyframe may be removed from the set of measurement data for that keyframe, by detecting whether each keyframe, in the set of keyframes without the candidate measurement data, is still directly or indirectly connected to all of the other keyframes in the set of keyframes by a sequence of one or more connections and if so, to remove that candidate measurement data.

Note that if a landmark point still relates to one or more measurements (but fewer than 3), then even though that landmark point is currently playing no part in the derivation of information from the key frames, it may still be retained. If a landmark point has no corresponding measurements, that landmark is redundant and may be removed.

In summary, a new connectivity test can be generated based on the omission of the candidate data (candidate entities for deletion can be: point measurements, keyframes), and a check is carried out to detect that sufficient connectivity is still provided despite the removal of that point.

The so-called connectivity between different key-frames is significant to many of these techniques. The connectivity indicates which points in one key-frame are also found in another key-frame. At a minimum, there should be at least three points connecting a key-frame to other key-frames, but to allow for errors or bad data, it is generally considered that at least six connections should be provided. A so-called connectivity matrix can be used to indicate connections between different key-frames. Whenever a point is to be removed from consideration (for example, as part of the process to select the 100 (or other number) points to be processed), a new connectivity matrix can be generated based on the omission of that candidate point, and a check is carried out to detect that sufficient connectivity is still provided despite the removal of that point.

Embodiments of the present invention can combine the benefits of a filter approach and a parallel tracking and mapping approach so as to give an initial approximation and allow a fast response to a changing camera position. This is similar to the arrangements described above, with the following notable features. Firstly, points are inserted into the map as rough points. One processor thread then tracks the camera position, initially on the basis of the rough points (camera tracking attempt uses the best information available, when not enough bundled points are found, it will start using lower quality points, this typically happens when expanding the map as the mapping thread maybe not enough responsive), and the other processor thread is useful map establishment. Secondly, points can be added at any time. That is to say, in some of the arrangements described above, new points can only be added at so-called key-frames (key-frames are used for global optimisation processes). If there is a significant amount of camera movement or other scene changes between key-frames, it is possible that the system may not have sufficient points to provide accurate camera tracking between key-frames. By allowing the addition of points to any frame, not just to key-frames, this problem can be alleviated. Note that in order to add a new key-frame also some connectivity requirements must be met. The system will fail to add a key-frame if the connectivity requirements are not satisfied.

In embodiments of the invention, the first time that particular points (landmarks) are identified, the depth within the captured scene of those landmarks is not known. A point can be defined by a ray (representing an angular position with respect to the camera viewpoint) and an estimate of a distribution of probability of different depths. This estimate can in some embodiments be derived from other nearby points. The estimate can represent a Gaussian probability distribution, for example.

When an image is captured from another direction, the Gaussian distribution of depth estimate from the second stretch and can be combined with the Gaussian distribution of depth as estimated the complete first direction, to give a sharper (more precisely defined) depth estimate distribution.

Building Detection and Initialization

Processes for initializing a detection of the side of a building and for detecting building orientation will now be discussed.

Tracking and mapping in respect of buildings can be significant, particularly in the context of computer games machines. For example, there may be a requirement to apply augmented reality characters to the side of a building. However, the initialization stage can be more difficult in respect of a building.

Lateral camera motion (to create two distinct images during the initialization phase) as discussed above may not be an appropriate initialization process in the case of a distant building, because the amount of lateral motion required to create the two images would be too large. A further potential problem arises from the fact that buildings are typically much taller than the camera position of a typical user.

Various techniques will now be described.

Firstly, a Sobel filtering or other process extracts edges (noting that in some arrangements Sobel filters extract an approximate gradient only).

In some embodiments, edges within a range of interest (for example, within a threshold angle of vertical, or within a threshold angle of horizontal) are detected, but in other embodiments of the invention gradient is detected over the entire image and afterwards, directions or ranges of directions of interest are detected.

Here, it is noted a gravity detector which is common in games machines (the accelerometer described above measures the gravity vector), mobile phones or tablet computers can give an indication of the vertical and horizontal orientation with respect to the camera.

In terms of a horizontal orientation on the building wall, an expectation is that edges which are near to horizontal will represent horizontal features on the wall, such as window frames and the like. In this way, if a peak in the distribution of image feature directions is found which is near to horizontal, that can be treated as a horizontal direction with respect to the wall. Vertical features on the wall such as the vertical edges of window frames will appear vertical on the two vertical in the image.

In embodiments of the invention the vertical direction is obtained directly from the accelerometer and the techniques rely on the fact that buildings are vertically aligned with gravity, so the only unknown is the rotation around the gravity vector. If it is assumed that a building is present, then the remaining angle can be estimated from the horizontal edges. Here, there is no need to extract edges as in the Canny edge detector; it is just the gradient information which is required. From these dimensions with respect to the wall, the orientation of the wall can be established.

Referring to the schematic flowchart of FIG. 24, a method of detecting the orientation of a building in an image captured by a camera involves the steps of:

at a step 1200, detecting a gravitational vertical direction with respect to the camera so as to detect a direction of vertical features of the building in the captured image;

at a step 1210, detecting image features in the captured image representing horizontal features of the building; and at a step 1220, detecting the orientation of the building, in the captured image, from the detected vertical direction and the detected orientation of the horizontal features.

This arrangement will be described further with respect to FIG. 25, which is an example image captured of a building.

Gravity 1230 is detected using the gravity detector associated with the camera. Based on the assumption that the building has been constructed so as to align with gravity (that is to say, the building is upright), this allow vertical features of the building such as the vertical sides 1240 of the window frames to be identified as features within a threshold angle of true vertical.

Then, based on the assumption that remaining features (for example, repetitive features) represent features of the building which are aligned with real horizontal, by detecting local gradients and excluding those at or near vertical, the orientation of those horizontal features can be detected. Note here that the reference is to features which are horizontal in reality; it is their deviation from horizontal in the image which indicates the orientation of the building relative to the camera.

This detection actually gives two directions in respect of the image of FIG. 25, a direction 1250 and a direction 1260. This in turn indicates that two sides of the building are being viewed. The respective angles 1250, 1260 indicate the orientation of the two visible sides of the building, and a local coordinate system can be established in respect of the left side of the building (as shown) based on axes parallel to the directions 1230 and 1250, and in respect of the right side of the building (as shown) based on axes parallel to the directions 1230 and 1260.

In further embodiments, variations (with image height) in the detected direction of horizontal building features can be used to indicate a variation in depth of the building, which is to say, an angle of apparent lean, caused by the fact that the user is much shorter than the building.

In embodiments of the invention the techniques of FIG. 24 can be implemented by (for example) the PED of FIG. 1, acting as an example of image processing apparatus operable to detect the orientation of a building in an image captured by a camera, the apparatus comprising: a gravity detector operable to detect a gravitational vertical direction with respect to the camera so as to detect a direction of vertical features of the building in the captured image; and an orientation detector operable to detect image features in the captured image representing horizontal features of the building and to detect the orientation of the building, in the captured image, from the detected vertical direction and the detected orientation of the horizontal features.

A further embodiment will now be described with reference to FIGS. 26 to 28. This relates to an arrangement for detecting the presence of a building in a captured image, particularly where the building does not fill the entire image.

Referring to FIG. 26, a method of detecting the presence of a building in a captured image comprises:

at a step 1300, dividing the captured image into a plurality of image regions;

at a step 1310, detecting a dominant angle of detected edges within each image region; and at a step 1320, detecting the presence of a building in an image region if the dominant angle of detected edges within that image region, excluding edges within a first threshold angle of vertical, is within a second threshold angle of horizontal and if the distribution of detected edges within the second threshold angle of horizontal is substantially the same as that of at least one adjacent image region.

FIG. 27 is an image of a building, and FIG. 28 schematically illustrates the output of the process defined above.

Referring to FIG. 27, the image has been divided into blocks 1330. In practice, a larger number of blocks might be used, but the number here has been limited for clarity of the diagram. But in general, the number of blocks simply depends upon the resolution to which the system requires an indication of the presence of absence of a building. Note that the division into blocks is merely for the purposes of the present analysis, and the word "division" simply means that the blocks are analysed separately.

There are various alternatives for proceeding in respect of the step 1310. In one example, gradient detection is applied to the whole image, and gradients near to vertical (for example, within a threshold angle of vertical, as detected using a gravity detector) are ignored In other words, this involves capturing one or more images of the building using a camera; detecting a gravitational vertical direction with respect to the camera so as to detect a direction of features within the first threshold angle of vertical in the captured images; and removing features within the first threshold angle of vertical from the captured images. In another example, a specific gradient detector arranged only to detect gradients around horizontal (for example, within a threshold angle of horizontal) is applied. In other cases, the orientation of the building may be detected as discussed above, and an image warping (distortion) applied so as to correct for the orientation. This means that genuinely horizontal building features should appear as horizontal image features in the warped image, so allowing a smaller (and less dependent upon camera orientation) threshold about the horizontal to be applied in the step 1310. So, this involves detecting image features in the captured image representing horizontal features of the building; and detecting the orientation of the building, in the captured image, from the detected vertical direction and the detected orientation of the horizontal features. In some embodiments, this is followed by applying an image transformation based upon the detected orientation of the building, prior to the step of detecting the presence of a building.

The dominant angle, amongst image positions or pixel positions in a block 1330, may be detected as (for example) a median value of detected edge directions. As an alternative, a modal angle could be treated as the dominant angle.

The detection of the dominant angle can be carried out performing the step of detecting the presence of a building in respect of an array of the blocks (image regions).

FIG. 28 schematically illustrates the results of the detection of dominant angles in the image of FIG. 27, in an arrangement in which the image is not pre-warped as discussed above. Here, the sloping lines (if present) in each block of FIG. 28 schematically illustrate the respective dominant angle.

The step 1320 then involves assessing which blocks relate to a building.

In embodiments of the invention, the tests applied at the step 1320 are:
 excluding edges within a first threshold angle of vertical, is the dominant angle within a second threshold angle of horizontal?
 and is the distribution of detected edges (for example, the median or modal angle within those detected edges) within the second threshold angle of horizontal substantially the same as that of at least one adjacent image region?

The first part of the test is looking for the horizontal features which are typical of a building. The second part of the test relates to the continuous nature of most buildings. So, assuming the angles shown in FIG. 28 lie within the required threshold of horizontal, each of the marked blocks in FIG. 28 would pass the second test, and so the extend of the marked blocks would indicate the approximate extent of the building.

Note that if image warping had been used to correct for the building orientation as discussed above, then the detected dominant angles shown in an equivalent of FIG. 28 would be almost (or exactly) horizontal.

In embodiments of the invention the techniques of FIG. 26 can be implemented by (for example) the PED of FIG. 1, acting as an example of image processing apparatus operable to detect the presence of a building in a captured image, the apparatus comprising: an image region processor operable to divide the captured image into a plurality of image regions and to detect a dominant angle of detected edges within each image region; and a detector operable to detect the presence of a building in an image region if the dominant angle of detected edges within that image region, excluding edges within a first threshold angle of vertical, is within a second threshold angle of horizontal and if the distribution of detected edges within the second threshold angle of horizontal is substantially the same as that of at least one adjacent image region.

Matching

A matching process will now be described according to embodiments of the invention.

At each frame or image, the process attempts to locate the same points so as to allow a detection of changes in camera position or pose between the frames. Whenever a new point is detected, a small image patch around each point is stored. The tracking process involves locating that image patch within a next image, for example by searching for it within a search area defined as a subset of the next image around the position in the preceding image at which the point was detected.

Accordingly, for a point in a preceding image, a predicted position can be generated (for example, using a Kalman filter and/or using camera movement data such as data acquired from accelerometers and/or gyroscopes associated with the device housing the camera). A search radius within the next image is applied around the predicted position and the image patch is located within the search radius. A sum of squared differences can be used to detect a good match, such that a sum which is below a threshold amount is indicative of a good match. The threshold can be made dependent upon the image contrast (detected as the image variance in the search radius. The image contrast may be quantized so as to generate a particular number of possible image contrast values. For each such possible value, a lookup table can be maintained to give a threshold value to be used. The matching threshold is approximately a linear function of the contrast.

In some embodiments, an actual image patch need not be stored; instead, a so-called image descriptor can be derived from the patch. During the comparison with the next image, candidate patches in the next image are processed so as to derive a corresponding image descriptor which is then compared with the stored image descriptor.

As mentioned above, sensors associated with the device housing the camera can be used to assist in detecting camera motion. In basic terms, a process for detecting a new camera pose (a so-called re-localisation process), possibly after a loss of tracking, can involve extracting image corner features, extracting image descriptors from the corner features, and correlating points detected in this way with stored map points using the image descriptors. From three such points, a camera pose can be established. This process can be carried out using multiple groups of three points. The best one is the group which gives the best positional match for other points. Within this process, the motion sensors discussed above can be used to discard bad solutions which do not indicate motion which correlates with that detected by the motion sensors.

An aim is to reduce the number of searches which is required, and so the number of points to be measured may be set at a particular predetermined number or predetermined maximum such as 100 points. It is then necessary to select which points should be detected in this way amongst all of the possible points within the image. One possibility is to select some points in each image tile or slice (that is, in each of a plurality of block-shaped regions of the image) so as to give a roughly even distribution of detected points across the image. Alternatively, or an addition, a sorting process can be applied based on a pseudorandom function and/or a quality metric. In embodiments of the invention, the points are selected based upon a quality metric relating to the degree of correlation of the image patches in a preceding image. New points can be added by running a corner detection process and checking a quality metric such as a variance indicating the degree of certainty that a corner has been detected, so that points relating to a more certain detections are selected.

As a general principle, however, in the present embodiments, given a fixed number of points which are allowable as part of the search process (such as 100 points) the available points are ranked in order of a quality metric, but in addition, a random or pseudorandom function is applied to the selection of points so that some "bad" points are selected as well as the "best" points. For example, a numerical value can be associated with each point so as to indicate the quality metric for that point. A pseudorandom number can then be added to that numerical value before the points are ranked in order of modified numerical value. The pseudorandom number may have a mean of zero (for example) and a variance selected so that the process will tend to pick the best points but will allow points to be selected which do not fall within the 100 best points in the image.

Considering this process in more detail, a reason for restricting the number of points to be examined to a particular number (such as 100) is in part to keep the CPU processing requirements under control. One technique to select points is a completely random selection. Another technique is to apply a pseudorandom distribution as a function of a quality parameter.

Specific arrangements, by way of example, will now be described with reference to FIGS. 29 and 30.

Referring to FIG. 29, there is provided a schematic flowchart in respect of a method of generating a three-dimensional map of a region from successive images of that region captured from different camera poses, the map comprising a set of landmark points each defined by a three dimensional spatial position and image information associated with that three dimensional position, the method comprising: capturing successive images of the region using a camera; designating a subset of the captured images as a set of keyframes each having respective sets of image position data representing image positions of landmark points detected as feature points in that image. The method comprises, in respect of a newly captured image, of detecting a position of the camera by detecting the position of landmark points in the newly captured image. The detecting step is illustrated schematically in FIG. 29 and comprises:

at a step 1400, generating a prediction of the camera position or pose, for example by deriving a camera pose for the newly captured image from a camera pose associated with a previous image and a detected angular velocity of the camera between the previous image and the current image;

at a step 1410, selecting an ordering of the landmark points detecting whether an image region of the newly captured image approximately matches an expected image position of a landmark point based on the predicted camera pose by detecting, for successive landmark points in the ordering, whether the image region is substantially identical to the image information associated with that landmark point; and at a step 1420, refining the prediction of the camera pose based on the detecting step.

According to the schematic flowchart of FIG. 30, in embodiments of the invention the selecting step comprises:

at a step 1430, performing a statistical test on the set of landmark points; and at a step 1440, selecting the ordering according to the results of the statistical test.

According to the arrangements described above, in a tracking system, each image has to be used to derive information defining where the camera is (the camera pose) in respect of that image. It is possible to predict, for example using input from a gyroscopic detector associated with the camera, roughly where the landmark points would be expected to be located in an image. This is an example of the use of a model is discussed in respect of the step 672 above. In particular, the position of a small patch in the newly captured image, which (hopefully) should relate to the image content associated with a landmark point, is predicted. A search is then carried out around the predicted position. In some embodiments, optical prediction is used to define the search areas (that is to say, prediction based upon image content) but when a solution for the camera pose (from the various comparisons with landmark points across the image) is sought, the solution can be initialized with information from the gyroscopic detector. So, a camera pose solver is initialized with a position derived from the gyroscopic detector, but an actual (final) camera pose is in fact derived which minimises the re-projection error in respect of those landmark points under consideration.

In an arrangement operating on a portable or low-power device, it would be appropriate to select a subset of landmark points for examination in this way. This is because a typical total number of landmark points (for example, 1000) can be too great a number to be dealt with during an image period by a low-power device.

One option is to limit the number of tests to a maximum number which can be performed in the available processing time. A potential problem here is that insufficient matching results may be obtained. Another option is to continue with the tests until a required number of good matches is obtained. But a potential difficulty here is that the time taken to carry out this series of tests cannot be predicted so easily. Accordingly, there is a potential conflict between processing time and obtaining enough well-matched points. Of course, in a real situation, the processing time is finite and limited so an important aspect is how to choose a subset of points for testing in such a way that a suitable number and quality of matches is obtained.

One technique is to assign, for example, a floating point random number to each landmark point and then to sort the set of landmark points according to the random number. The random numbers could be assigned according to a uniform distribution. But according to embodiments of the present technique, the distribution of the random numbers can be adjusted or skewed in order to make it more likely that landmark points will be selected which will give a good or useful match.

Note that the process is still random, so that each point should still have some probability of being adopted for testing, but the selection is skewed towards points which are deemed to be more likely to give a useful result.

The random number distribution can be skewed by, for example, applying a mapping tween a uniform distribution random number and an output random number such that random numbers towards either the lower or the upper end of the range (depending on the manner in which the ordering is drawn) stand a greater chance of being assigned to those landmark points which are deemed to be more useful in this context.

Before discussing in detail how the assessment of "more useful" or "less useful" is detected, the mechanism for skewing the random distribution will first be discussed with reference to FIGS. 31 and 32.

FIG. 31 schematically illustrates a part of the operation of the PED 10, showing a random number generator 1450 providing uniform distribution random numbers to a mapping function 1470 operating under the control of a statistical test 1460 (which will be described further below). In respect of a particular landmark point, the random number assigned to that landmark point is based upon the random number of the uniform distribution as modified by the mapping function 1470. A selector 1480 selects successive landmark points for testing according to the ordering of the random numbers.

FIG. 32 schematically illustrates a mapping function showing a relationship between an input random number on the horizontal axis (assuming for the purposes of this example the random numbers are floating point numbers with a range of 0 to 1 inclusive) and an output random number on the vertical axis. The relationship is provided by a curve 1490.

In operation, with the curve 4490 in the position shown, a uniformly distributed import random number is mapped to an output random number with an increased likelihood of being nearer to 1 than to 0. So, in this example, if the selection of landmark points is based on an ordering of the random numbers from 0 to 1, there is a reduced likelihood that a landmark point subjected to the mapping function 1490 would be selected. On the other hand, if the selection of landmark points for processing is based on an ordering of the output random numbers from 1 to 0, there is an increased likelihood that a landmark point subject to the mapping function 4090 would be selected. It is the mapping function which is changed by the output of the statistical test 1460, for example between the mapping function 1490 and a generally opposite mapping function 1500. Accordingly, by this means, the selection of an order for processing of the landmark points is partly random and partly influenced by the output of the statistical test 1460.

The nature of the statistical test will now be discussed further.

In one embodiment, the statistical test relates to the detection of a "quality parameter" dependent upon the number of statistically good matches obtained for a landmark point (for example, an SSD result below a certain threshold). In one example, the quality parameter is equal to the number of good matches divided by the number of attempted matches, and may be limited in extent to a predetermined number of preceding images such as 8 images. The mapping function is arranged so that for a quality parameter of 100%, the mapping function is set to the curve 1490 (assuming that landmark points are selected according to the random number from 1 down to 0), and for a quality parameter of 0%, the mapping function is set to the curve 1500. In between these limits, the mapping function varies proportionately, so that the straight line 1510 of FIG. 32 corresponds to a quality parameter of 50%.

The random number function is not a requirement, and a different, non-random, distribution could be applied to the ordering of the landmark points, but still according to the output of the statistical test.

Other example options for the statistical test include:

(i) A detection of whether the landmark point is considered an "inlier" or an "outlier" in a statistical test relating to the goodness of fit of that landmark point during the bundle adjustment process; the distribution would be skewed away from outliers and towards inliers.

(ii) A detection of the "visibility" of the landmark point, for example by detecting a difference between the camera orientation at the time the landmark point was captured and the estimated camera orientation for the newly captured image; a large angular difference would indicate a low quality parameter and a need to skew the distribution against selection of that point. Conversely, a small angle difference would indicate a high quality parameter and an aim to skew the distribution towards selection of that point.

(iii) A detection of the image separation of the landmark points, so that widely spaced landmark points (in terms of their predicted image position) are favoured for selection by the mapping function over closely spaced landmark points.

In general, the testing is continued until a required number of matching points has been obtained, subject to the testing stopping, for example when a predetermined stage in the image period has been reached (in other words, the system has run out of time).

In some embodiments, the newly captured image may be divided (purely for the purposes of this technique) into a plurality of image regions. The number of matches deemed necessary for the whole image is divided by the number of image regions. Within each image region, the techniques described above (for example, a weighted random distribution) are applied to select landmark points for testing. Once the required number of matches for an image region has been obtained, processing moves to the next image region. If the required number of matches is not obtained for an image region, the shortfall (the difference between the actual number obtained and the required number for that image region) is divided among remaining image regions which have not yet been processed. This provides an example of dividing the newly captured image into a plurality of image regions; and carrying out the selecting step separately in respect of each of the image regions so as to select a second ordering of landmark points for each image region. The detecting step may be carried out in respect of an image region until a required number of detections has been achieved for that image region. In some embodiments, if fewer than a required number of landmark points are identified in respect of an image region, the difference between the actual number and the required number is redistributed amongst other image regions as an increase in their respective required numbers.

As one example of a statistical test, as discussed above, the performing step may comprise detecting those landmark points which have achieved at least a threshold proportion of matches over a predetermined number of recent operations of the detecting step in respect of those landmark points. As another example, the performing step can comprise detecting landmark points having spaced-apart predicted positions in the newly captured image.

Although a random distribution is not a requirement, in some embodiments the selecting step comprises selecting a random ordering of the landmark points, such that the position of a landmark point in the random ordering is partly dependent on the results of the statistical test.

In embodiments of the invention the techniques of FIGS. 29-32 can be implemented by (for example) the PED of FIG. 1, acting as an example of image processing apparatus operable to generate a three-dimensional map of a region from successive images of that region captured from different camera positions or poses, the map comprising a set of landmark points each defined by a three dimensional spatial position and image information associated with that three dimensional position, a subset of the captured images being designated as a set of keyframes each having respective sets of image position data representing image positions of landmark points detected as feature points in that image the apparatus comprising:

a predicted position detector operable in respect of a newly captured image to detect a prediction of the camera pose for the newly captured image;

a selector operable to select an ordering of the landmark points; and a detector for detecting whether an image region of the newly captured image approximately matches an expected image position of a landmark point based on the predicted camera pose by detecting, for successive landmark points in the ordering, whether the image region is substantially identical to the image information associated with that landmark point; and a prediction processor for refining the prediction of the camera pose based on the detecting step;

in which the selector comprises:

means for performing (or testing circuitry configured to perform) a statistical test on the set of landmark points; and means for selecting (or a selector configured to select) the ordering according to the results of the statistical test.

Gravity Detection

Further techniques for using the gravity information captured by, for example, an accelerometer associated with the PED 10 will now be discussed. These may be used instead of or in addition to the techniques discussed earlier.

FIG. 33 is a schematic flowchart illustrating aspects of a method of generating a three-dimensional map of a region from successive images of that region captured from different camera poses, the map comprising a set of landmark points each defined by a three dimensional spatial position and image information associated with that three dimensional position. A subset of the captured images may be designated as a set of keyframes each having respective sets of image position data representing image positions of landmark points detected as feature points in that image.

According to FIG. 33, the method comprises:

at a step 1600, capturing successive images of the region;

at a step 1610, detecting a gravitational vertical direction in respect of each captured image;

at a step 1620, detecting feature points within the captured images;

in respect of an image captured at a relocalisation operation:

at a step 1630, deriving a camera pose for that image from detected feature points in that image;

at a step 1640, rotating the gravitational vertical direction in respect of that image to the coordinates of a reference keyframe using the camera poses derived for that image and the reference keyframe;

at a step 1650 comparing the rotated gravitational vertical direction with the actual gravitational vertical direction associated with the reference keyframes so as (at a step 1660) to detect a quality measure of that image.

This technique relates in particular to a so-called re-localisation technique. A re-localisation operation takes place when the tracking system has failed and so a fresh start is required. This is not the same as an initialization operation where there is no advanced knowledge of any data at all; it is just that localisation based upon the existing map is not possible. At a re-localisation, because the system has lost tracking, a hypothesis (effectively, a guess) relating to which points match which landmark points is attempted, and then tested for its quality. This process continues until a match has been re-acquired.

At a re-localisation operation, the system may not know which points in the newly captured image are good matches to landmark points. For various reasons, incorrect matches could be obtained and if a prediction of camera pose were to be based upon those matches, a significant error could be the result. There is therefore a need to detect the quality of matches against landmark points at a re-localisation operation. However, there may not be the processing resources to carry out an exhaustive test of all possible landmark matches; instead, a quality measure associated with the detected match is useful.

The present embodiments achieve this quality measure at a re-localisation operation by analysis of gravity data.

A gravity vector is detected in respect of each captured image. Gravity data is retained at least in respect of a reference keyframe such as the first-captured keyframe. The gravity data associated with the reference keyframe may represent an average of gravity vectors, transformed to the coordinate system of the reference keyframe, for several frames, for example for all the other keyframes as well as the reference keyframe. One reason why an average of this nature is good is that the detected acceleration due to gravity generally has a much greater magnitude than acceleration due to movement of the device, so that an average of the detected accelerations will tend to give a good approximation of the gravity vector and cancel out acceleration due to movement of the device. This is therefore an example of a system in which the actual gravitational vertical direction associated with the reference keyframe depends upon a gravity direction associated with two or more keyframes.

At the re-localisation operation, an attempt is made to generate a camera pose from matched landmark points in the newly captured image. Because this is a re-localisation, the generation of the camera pose involves testing a hypothesis relating to the location of landmark points in the newly captured image. A camera pose is derived from such a hypothesis and then tested by establishing what the gravity vector would be, if the camera pose were correct, rotating that gravity vector into the coordinate system of the reference keyframe and comparing it with the gravity data associated with that reference keyframe. If the gravity vectors point in the same direction or are within a threshold deviation of the same direction (for example, +/−5°) then the hypothesis can be deemed to be acceptable. If not, another hypothesis is tried.

An example of this process is shown schematically in FIG. 34 which shows (in a similar manner to FIG. 6) a collection of points in space 1670, the coordinate system of a reference keyframe 1680, along with its gravity vector 1690, the coordinate system and gravity vector of another keyframe 1700 and the coordinate system 1710 and gravity vector 1720 derived from a camera pose generated according to a hypothesis during a re-localisation operation. If the gravity vector 1690 associated with the reference keyframe is within the threshold angular deviation of the gravity vector 1720 generated from the camera pose which in turn was generated according to the hypothesis, then the hypothesis is treated as potentially valid, or at least has a high quality score associated with it. If not, another hypothesis may be tried. Accordingly, this is an example of a system in which, if the rotated gravitational vertical direction with the actual gravitational vertical direction associated with the reference keyframe differ by more than a threshold difference, the deriving step is repeated in respect of a different set of landmark points.

In the case of a potentially valid or high-quality hypothesis, further analysis can be carried out involving testing further landmark points in the newly captured image and applying solving technology to generate a final camera pose in respect of that image As an alternative to testing the hypothesis, embodiments of the technique involve performing tests (for example, in addition to the tests discussed above) to detect whether or not to designate the image as a keyframe, the test outcome varying according to the detected quality measure for that candidate keyframe.

In embodiments of the invention the techniques of FIGS. 33 and 34 can be implemented by (for example) the PED of FIG. 1, acting as an example of image processing apparatus operable to generate a three-dimensional map of a region from successive images of that region captured from different camera poses, the map comprising a set of landmark points each defined by a three dimensional spatial position and image information associated with that three dimensional position, a subset of the captured images being designated as a set of keyframes each having respective sets of image position data representing image positions of landmark points detected as feature points in that image; the apparatus comprising:

a camera for capturing successive images of the region;

a gravity detector for detecting a gravitational vertical direction in respect of each captured image;

a relocalisation controller operable, in respect of an image captured at a relocalisation operation to:

(i) derive a camera pose for that image from detected landmark points in that keyframe;

(ii) rotate the gravitational vertical direction in respect of the image to the coordinates of a reference keyframe using the camera poses derived for that image and the reference keyframe; and (iii) compare the rotated gravitational vertical direction with the actual gravitational vertical direction associated with the reference keyframe so as to detect a quality measure of that image.

In other embodiments, the angular velocity detector of the PED 10 is used according to a technique shown in the schematically chart of FIG. 35. This flowchart relates to a method of generating a three-dimensional map of a region from successive images of that region captured from different camera poses, the map comprising a set of landmark points each defined by a three dimensional spatial position and image information associated with that three dimensional position. A subset of the captured images is designated as a set of keyframes each having respective sets of image position data representing image positions of landmark points detected as feature points in that image. The technique involves:

at step 1800, capturing successive images of the region using a camera;

at a step 1810, detecting feature points within the captured images;

at step 1820, detecting the angular velocity of the camera;

at step 1830, in respect of a newly captured image, detecting a pose of the camera by detecting the position of landmark points in the newly captured image;

at step 1840, integrating the angular velocity of the camera since a previous image was captured; and at step 1850, predicting the position of the landmark points in the newly captured image from the integrated acceleration and the position of the landmark points in the previous image.

The steps 1850 may also comprise applying a statistical search to detect the position of the landmark points in the newly captured image, based upon the predicted positions.

The step 1830 may comprise executing a camera pose solver to detect a camera pose from the integrated angular velocity and two or more detected landmark points in the image.

This technique addresses the problem of accuracy of the detection of camera pose (in particular, orientation) from a potentially limited number of visual points. Even though a gyroscopic detector may be provided, giving an angular velocity detection, in order to derive the pose absolutely from the gyroscopic detector and integration would be required which can in turn leads to drift or other integration errors. Also, the gyroscopic detector itself may drift over time.

However, if the previous pose (that is to say, the pose in respect of a preceding image such as the immediately preceding image) is considered to be correct, then the drift and integration errors can be reduced in their severity by simply integrating the angular velocity from the gyroscopic detector since that preceding image. This can provide an estimate of the rotation of the camera (such as the PED) since the preceding image was captured.

A further estimation is generated in respect of the translation of the PED.

As discussed above, an aim of using gyroscopic sensor data is to improve the estimation of a camera pose. In embodiments of the invention, the estimator logic (a so-called M-Estimator) used for pose estimation can tolerate up to 50% of outlier measurements in theory, but in practice this limit may be less than 50%. In situation where the number the number of outliers is higher than 50% (for example, where the images include moving people, cars and the like where corners or feature points may be detected but the points are unreliable for tracking) a more robust way of estimating the camera pose is provided by the present embodiments. One previously proposed technique is to use a RANSAC type algorithm with a "p3p" algorithm (pose from 3 points) in order to generate candidate poses. This algorithm is however too slow for frame to frame tracking on low powered devices and so it cannot be employed in the present embodiments.

In the present case, a RANSAC type algorithm is employed which samples a reduced or minimal set of measurements in order to estimate a candidate camera pose. The candidate camera pose is then scored against the remaining measurements. The candidate pose is adopted that given the highest number of inliers and exceeds a minimum threshold of inliers. By exploiting the integrated gyro (angular velocity) information, for example representing motion since the immediately preceding image, it is possible to generate candidate poses in a much more efficient way than the classical p3p algorithm (which can be rather slow). Further as candidate camera poses are generated from 2 rather than 3 measurements like in the p3p case, potentially far fewer candidate poses need to be generated before finding the correct solution.

The number of required candidate poses is function of the sample size used to estimate a single candidate pose.

For example if there are 80% of outliers then a RANSAC and P3P approach will require at least 574 iterations while a system which estimates the camera pose using only 2 points will need 113 iterations.

In more detail, in embodiments of the invention the following steps are performed:

(a) Predict the current rotation at time t by integrating the angular velocity reported by the gyro starting from the last estimated orientation at time t−1. (Here, the times t, t−1 and so on may refer to the capture times of successive images, for example). Note that the orientation at time t−1 was computed by fusing vision+gyro data (it is the result of the tracking algorithm at time t−1).

Given a predicted rotation which is considered to be accurate enough the translation component of the inter-image camera motion is estimated as follows:

(b) Sample two measurements from the set of the measured landmarks. Two 2D measurements with their associated 3D points are sufficient in order to estimate the camera translation for a fixed rotation. So the sample is used in order to solve for a candidate camera translation. A simple set of simultaneous equations provides this information. This is much faster than using the classical p3p algorithm and so suitable for frame to frame tracking on a low powered device.

(c) The candidate camera pose, formed of the predicted orientation and computed translation, is scored against the entire set of measurements. The best camera pose will have a smaller cost. (for example, smaller residuals). If the camera pose has more than N inliers (for example, at least 7 inliers) the candidate camera pose is saved together with its score.

(d) The above steps (b) and (c) are repeated M times (for example, M=100), then the candidate camera pose that scored best is selected. If the set of camera poses is empty because the minimum numbers of inliers requirements was not satisfied, then there is no solution and the system declares a tracker failure which will trigger a much slower relocalisation algorithm next frame.

(e) If step (d) has reported a valid solution, the system can then discard outlier measurements and solve for the camera pose including both rotation and translation.

An M-estimator is used, and the system attempts to minimise the sum of residuals derived from image measurements, plus an extra error term which is gyro related. Specifically the orientation predicted in stage (a) above is taken as an orientation measurement Rp (3×3 orientation measurement matrix). The M-estimator we run in step 5 below is fed the camera pose solution coming from the previous step as initial solution before starting the iterative nonlinear robust least squares solver (M-estimator), Further only inliers found in step (d) are used in the solution process.

$$\text{cost=Klein cost} + (\text{Log}(Rp^{T}*R)^{T}*\text{Log}(Rp^{T}*R))/\text{sdev}$$

Rp=orientation measurement.
R=orientation that we want to estimate.
sdev=standard deviation of the orientation error or a constant
$\text{Log}(Rp^{T}*R)^{T}*\text{Log}(Rp^{T}*R)$ is a scalar measuring the distance between the measured orientation and the orientation R we want to solve for.

Note that we the predicted orientation in stage (a) can be used as a orientation measurement in the final cost calculation under the assumption that:

a. The previous camera pose has zero mean noise.
b. The gyro has zero mean noise.
c. The gyro bias is not significant within a such small interval. Alternatively there are way of estimating the gyro bias and removing it before starting stage 1.

As the cost incorporates visual measurements they will also affect the final estimated orientation.

Accordingly, in some embodiments the camera pose solver estimates multiple candidate camera poses from respective subsets of the landmark points and the integrated angular velocity and selects as a camera pose, a best candidate camera pose based on a comparison with other landmark points. Embodiments may involve estimating a translation of the camera since the previous image was captured, the camera pose solver estimating a camera pose based on the intergrated angular velocity and the estimated translation.

In embodiments of the invention the techniques of FIG. 35 can be implemented by (for example) the PED of FIG. 1, acting as an example of image processing apparatus operable to generate a three-dimensional map of a region from successive images of that region captured from different camera poses, the map comprising a set of landmark points each defined by a three dimensional spatial position and image information associated with that three dimensional position, a subset of the captured images being designated as a set of keyframes each having respective sets of image position data representing image positions of landmark points detected as feature points in that image; the method comprising:

a camera for capturing successive images of the region using a camera, the camera having an associated angular velocity detector;

a camera pose detector operable, in respect of a newly captured image, to detect a position of the camera according to the position of landmark points in the newly captured image, the detector being operable to integrate the angular velocity of the camera since a previous image was captured; and to predict the position of the landmark points in the newly captured image from the integrated acceleration and the position of the landmark points in the previous image.

REFERENCES

Archived copies are available on request.
http://www.robots.ox.ac.uk/~gk/publications/KleinMurray2009ISMAR.pdf
Georg Klein and David Murray, "Parallel Tracking and Mapping on a Camera Phone", In Proc. International Symposium on Mixed and Augmented Reality (IS-MAR'09, Orlando), 2009
http://publications.asl.ethz.ch/files/kneip11robust.pdf
L. Kneip, M. Chli, R. Siegwart, "Robust Real-Time Visual Odometry with a Single Camera and an IMU", British Machine Vision Conference (BMVC), Dundee, August 2011
http://www.robots.ox.ac.uk/~lav/Papers/klein_murray_eccv2008/klein_murray_eccv2008.pdf
Georg Klein and David Murray, "Improving the agility of keyframe-based SLAM", Proceedings of the European Conf on Computer Vision, Marseille, October 2008
http.//www.inf.u-szeged.hu/~kato/teaching/computervision/Lab05-RANSAC.pdf
"Robust estimation: RANSAC"—University of Szeged, Institute of Informatics: Computer Vision Lab Lecture Notes
http://cmp.felk.cvut.cz/minimal/5_relative.php
Webpage—"5-point relative pose problem"
http://www.vision.caltech.edu/bouquetj/calib_doc/htmls/parameters.html
Webpage—"Camera Calibration Toolbox for Matlab"
http://en.wikipedia.org/wiki/File:Epipolar_geometry.svg
Webpage—"Epipolar geometry"
http://en.wikipedia.org/wiki/Axis%E2%80%93angle_representation
Webpage—"Axis-angle estimation"

The invention claimed is:

1. A method of generating a three-dimensional map of a region from successive images of the region captured from different camera positions, the map comprising a set of landmark points each defined by a three dimensional spatial position and image information associated with that three dimensional position, the method comprising:
   capturing, by an imaging device, successive images of the region;
   detecting, by a processor, feature points within the captured images;
   designating, by the processor, a subset of the captured images as a set of keyframes each having respective sets of measurement data representing image positions of landmark points detected as feature points in that image, each keyframe being connected to at least one other keyframe in the set by a connection comprising at least a threshold number of landmark points, having corresponding measurement data for that keyframe, in common with the same landmark points having corresponding measurement data for that other keyframe in the set, and the set of keyframes being such that each keyframe in the set is directly or indirectly connected to all of the other keyframes in the set by a sequence of one or more such connections;
   detecting, by the processor, whether candidate measurement data associated with a given one of the keyframes may be removed from the set of measurement data for that keyframe, by detecting whether each keyframe, in the set of keyframes without the candidate measurement data, is still directly or indirectly connected to all of the other keyframes in the set of keyframes by a sequence of one or more connections;
   and if so, removing that candidate measurement data.

2. A method according to claim 1, in which the threshold number of landmark points is at least three.

3. A method according to claim 1, in which the step of detecting whether candidate measurement data may be removed comprises:
   generating a connection graph between the keyframes of the set, excluding the candidate measurement data, by connected components analysis; and
   removing the candidate measurement data if the connection graph comprises only one component.

4. A method according to claim 3, in which, where the candidate measurement data comprises all measurement data associated with a keyframe:
   the detecting whether candidate measurement data may be removed further comprises detecting whether each keyframe, in the set of keyframes, excluding the keyframe corresponding to the candidate measurement data, is still directly or indirectly connected to all of the other keyframes in the set of keyframes, excluding the keyframe corresponding to the candidate measurement data, by a sequence of one or more connections; and
   the removing step comprises removing that keyframe from the set of keyframes.

5. A method according to claim 1, in which the designating step comprises designating a captured image as a keyframe by:
   detecting whether at least a threshold number of feature points within that captured image correspond to landmark points for which one or more keyframes in the set of keyframes have associated measurement data.

6. A method according to claim 1, in which the designating step comprises designating a captured image as a keyframe by:
   detecting whether the feature points in the captured image represent a view which is sufficiently different to that of the corresponding landmark points as to allow triangulation of a respective position from the feature points and the corresponding landmark points.

7. A method according to claim 1, in which each keyframe has associated camera position data defining a three dimensional camera position and orientation for that image.

8. A method according to claim 7, further comprising:
   refining the measurement data and the camera position data associated with at least a subset of the keyframes by:
      deriving a difference between the measurement data for landmark points in the keyframes and corresponding image positions obtained from the camera position data and the three dimensional spatial position of that landmark point; and
      adjusting one or both of the camera position data for one or more keyframes and the three dimensional spatial position of one or more landmark points so as to reduce the detected difference.

9. A non-transitory computer-readable recording medium storing computer instructions thereon, the computer instructions, when executed by a computer, causes the computer to carry out a method of of generating a three-dimensional map of a region from successive images of the region captured from different camera positions, the map comprising a set of landmark points each defined by a three dimensional spatial position and image information associated with that three dimensional position, the method comprising:
   capturing successive images of the region;
   detecting feature points within the captured images;
   designating a subset of the captured images as a set of keyframes each having respective sets of measurement data representing image positions of landmark points detected as feature points in that image, each keyframe being connected to at least one other keyframe in the set by a connection comprising at least a threshold number of landmark points, having corresponding measurement data for that keyframe, in common with the same landmark points having corresponding measurement data for that other keyframe in the set, and the set of keyframes being such that each keyframe in the set is directly or indirectly connected to all of the other keyframes in the set by a sequence of one or more such connections;
   detecting whether candidate measurement data associated with a given one of the keyframes may be removed from the set of measurement data for that keyframe, by detecting whether each keyframe, in the set of keyframes without the candidate measurement data, is still directly or indirectly connected to all of the other keyframes in the set of keyframes by a sequence of one or more connections;
   and if so, removing that candidate measurement data.

10. The non-transitory computer-readable recording medium of claim 9, in which the step of detecting whether candidate measurement data may be removed comprises:
   generating a connection graph between the keyframes of the set, excluding the candidate measurement data, by connected components analysis; and
   removing the candidate measurement data if the connection graph comprises only one component.

11. Image processing apparatus operable to generate a three-dimensional map of a region from successive captured images of the region captured from different camera positions, the map comprising a set of landmark points each defined by a three dimensional spatial position and image information associated with that three dimensional position, a subset of the captured images being designated as a set of keyframes each having respective sets of measurement data representing image positions of landmark points detected as feature points in that image, each keyframe being connected to at least one other keyframe in the set by a connection comprising at least a threshold number of landmark points, having corresponding measurement data for that keyframe, in common with the same landmark points having corresponding measurement data for that other keyframe in the set, and the set of keyframes being such that each keyframe in the set is directly or indirectly connected to all of the other keyframes in the set by a sequence of one or more such connections, the apparatus comprising:

a detector configured to detect whether candidate measurement data associated with a keyframe may be removed from the set of measurement data for that keyframe, by detecting whether each keyframe, in the set of keyframes without the candidate measurement data, is still directly or indirectly connected to all of the other keyframes in the set of keyframes by a sequence of one or more connections and if so, to remove that candidate measurement data.

12. Computer games apparatus comprising:

an image processing apparatus according to claim 11; and an image renderer configured to render an image for display by combining a captured image with one or more computer-generated image portions generated with respect to map positions associated with feature points of the captured image.

13. Apparatus according to claim 12, comprising a camera configured to capture the images.

* * * * *